(12) United States Patent
Platner et al.

(10) Patent No.: US 12,439,140 B2
(45) Date of Patent: Oct. 7, 2025

(54) INTEGRATED SENSOR-LENS ASSEMBLY ALIGNMENT IN IMAGE CAPTURE SYSTEMS

(71) Applicant: GoPro, Inc., San Mateo, CA (US)

(72) Inventors: David Thomas Platner, San Francisco, CA (US); Jonathan Stern, San Mateo, CA (US); Ian Copeland Griggs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 282 days.

(21) Appl. No.: 18/133,315

(22) Filed: Apr. 11, 2023

(65) Prior Publication Data

US 2024/0348903 A1  Oct. 17, 2024

(51) Int. Cl.
*H04N 23/55* (2023.01)
*G02B 7/02* (2021.01)
*H04N 23/698* (2023.01)

(52) U.S. Cl.
CPC ............. *H04N 23/55* (2023.01); *G02B 7/022* (2013.01); *G02B 7/025* (2013.01); *H04N 23/698* (2023.01)

(58) Field of Classification Search
CPC ...... H04N 23/55; H04N 23/698; G02B 7/022; G02B 7/025
See application file for complete search history.

(56) References Cited

U.S. PATENT DOCUMENTS

| 5,832,153 | A  | 11/1998 | Duck |
| 6,215,924 | B1 | 4/2001 | Hulse |
| 7,139,473 | B2 | 11/2006 | Shimano |
| 7,190,389 | B1 | 3/2007 | Abe |
| 7,283,854 | B2 | 10/2007 | Sato |
| 7,397,511 | B2 | 7/2008 | Ezawa |
| 7,619,683 | B2 | 11/2009 | Davis |
| 7,626,612 | B2 | 12/2009 | John |
| 7,724,284 | B2 | 5/2010 | Mentzer |
| 7,856,180 | B2 | 12/2010 | Chishima |
| 7,859,588 | B2 | 12/2010 | Parulski |

(Continued)

FOREIGN PATENT DOCUMENTS

| CN | 101833157 A | 9/2010 |
| CN | 113238351 A | 8/2021 |

(Continued)

OTHER PUBLICATIONS

International Search Report and Written Opinion for PCT/US2016/021269, May 17, 2016, 14 Pages.

(Continued)

*Primary Examiner* — Hung H Lam

(74) *Attorney, Agent, or Firm* — Young Basile Hanlon & MacFarlane, P.C.

(57) ABSTRACT

An optical module for an image capture system is disclosed. The optical module includes a first integrated sensor-lens assembly (ISLA) that is oriented in a first direction and which defines a first optical axis and first mounting surfaces; a second ISLA that is oriented in a second, opposite direction and which defines a second optical axis coincident with the first optical axis and second mounting surfaces; and an adhesive that is located between the first mounting surfaces and the second mounting surfaces such that the first ISLA and the second ISLA are directly connected together.

20 Claims, 17 Drawing Sheets

(56) References Cited

U.S. PATENT DOCUMENTS

| | | |
|---|---|---|
| 7,961,234 B2 | 6/2011 | Viinikanoja |
| 8,004,555 B2 | 8/2011 | Oswald |
| 8,046,026 B2 | 10/2011 | Koh |
| 8,149,327 B2 | 4/2012 | Lin |
| 8,208,062 B2 | 6/2012 | Lin |
| 8,451,312 B2 | 5/2013 | Lee |
| 8,730,299 B1 | 5/2014 | Kozko |
| 9,007,431 B1 | 4/2015 | Kozko |
| 9,148,588 B2 | 9/2015 | Jung |
| 9,185,279 B2 | 11/2015 | Masuda |
| 9,197,885 B2 | 11/2015 | Sun |
| 9,232,151 B1 | 1/2016 | Azuma |
| 9,330,436 B2 | 5/2016 | Macmillan |
| 9,332,167 B1 | 5/2016 | Pance |
| 9,521,321 B1 | 12/2016 | Kozko |
| 9,589,317 B2 | 3/2017 | Ozaki |
| 9,754,159 B2 | 9/2017 | Macmillan |
| 9,756,243 B2 | 9/2017 | Shohara |
| 9,760,768 B2 | 9/2017 | Macmillan |
| 9,977,226 B2 | 5/2018 | Davies |
| 9,992,394 B2 | 6/2018 | Abbas |
| 10,404,901 B2 | 9/2019 | Abbas |
| 10,429,625 B2 | 10/2019 | Davies |
| 10,462,442 B2 | 10/2019 | Walker |
| 10,574,871 B2 | 2/2020 | Abbas |
| 10,904,414 B2 | 1/2021 | Abbas |
| 11,445,126 B2 | 9/2022 | Cotoros |
| 2004/0021792 A1 | 2/2004 | Yasui |
| 2004/0048633 A1 | 3/2004 | Sato |
| 2005/0046740 A1* | 3/2005 | Davis ................ H04N 7/142 348/E7.079 |
| 2005/0237424 A1 | 10/2005 | Weekamp |
| 2006/0087751 A1 | 4/2006 | Liu |
| 2006/0187560 A1 | 8/2006 | Chou |
| 2007/0070204 A1 | 3/2007 | Mentzer |
| 2007/0269205 A1 | 11/2007 | Lee |
| 2007/0279482 A1 | 12/2007 | Oswald |
| 2008/0064437 A1 | 3/2008 | Chambers |
| 2008/0218611 A1 | 9/2008 | Parulski |
| 2008/0218612 A1 | 9/2008 | Border |
| 2009/0017867 A1 | 1/2009 | Koh |
| 2009/0047995 A1 | 2/2009 | Futter |
| 2009/0148149 A1 | 6/2009 | Chishima |
| 2010/0045773 A1 | 2/2010 | Ritchey |
| 2010/0072373 A1 | 3/2010 | Nakajima |
| 2010/0165155 A1 | 7/2010 | Chang |
| 2010/0231779 A1 | 9/2010 | Lin |
| 2011/0164105 A1 | 7/2011 | Lee |
| 2012/0019661 A1 | 1/2012 | Thomson |
| 2012/0148192 A1 | 6/2012 | Nakanishi |
| 2012/0274800 A1* | 11/2012 | Vakil ................ H04N 23/57 29/829 |
| 2013/0242040 A1 | 9/2013 | Masuda |
| 2014/0168424 A1 | 6/2014 | Attar |
| 2014/0192144 A1 | 7/2014 | St. Clair |
| 2014/0218587 A1 | 8/2014 | Shah |
| 2014/0267596 A1 | 9/2014 | Geerds |
| 2015/0256746 A1 | 9/2015 | Macmillan |
| 2015/0271483 A1 | 9/2015 | Sun |
| 2015/0279038 A1 | 10/2015 | Macmillan |
| 2016/0061954 A1 | 3/2016 | Walsh |
| 2016/0274338 A1 | 9/2016 | Davies |
| 2017/0111559 A1* | 4/2017 | Abbas ................ G03B 17/12 |
| 2018/0020160 A1* | 1/2018 | Lin ................ H04N 23/45 |
| 2018/0070003 A1* | 3/2018 | Ramseyer ............ H04N 23/90 |
| 2018/0262682 A1* | 9/2018 | Wang ................ H04N 23/698 |
| 2018/0275377 A1 | 9/2018 | Davies |
| 2018/0278818 A1 | 9/2018 | Abbas |
| 2019/0342476 A1 | 11/2019 | Abbas |
| 2020/0259978 A1 | 8/2020 | Abbas |
| 2022/0124230 A1* | 4/2022 | Brookmire ............ G02B 7/005 |

FOREIGN PATENT DOCUMENTS

| | | |
|---|---|---|
| CN | 214205656 U | 9/2021 |
| CN | 114089586 A | 2/2022 |
| WO | 2010037176 A1 | 4/2010 |

OTHER PUBLICATIONS

International Search Report and Written Opinion for PCT/US2016/021269, May 17, 2016, 8 Pages.

* cited by examiner

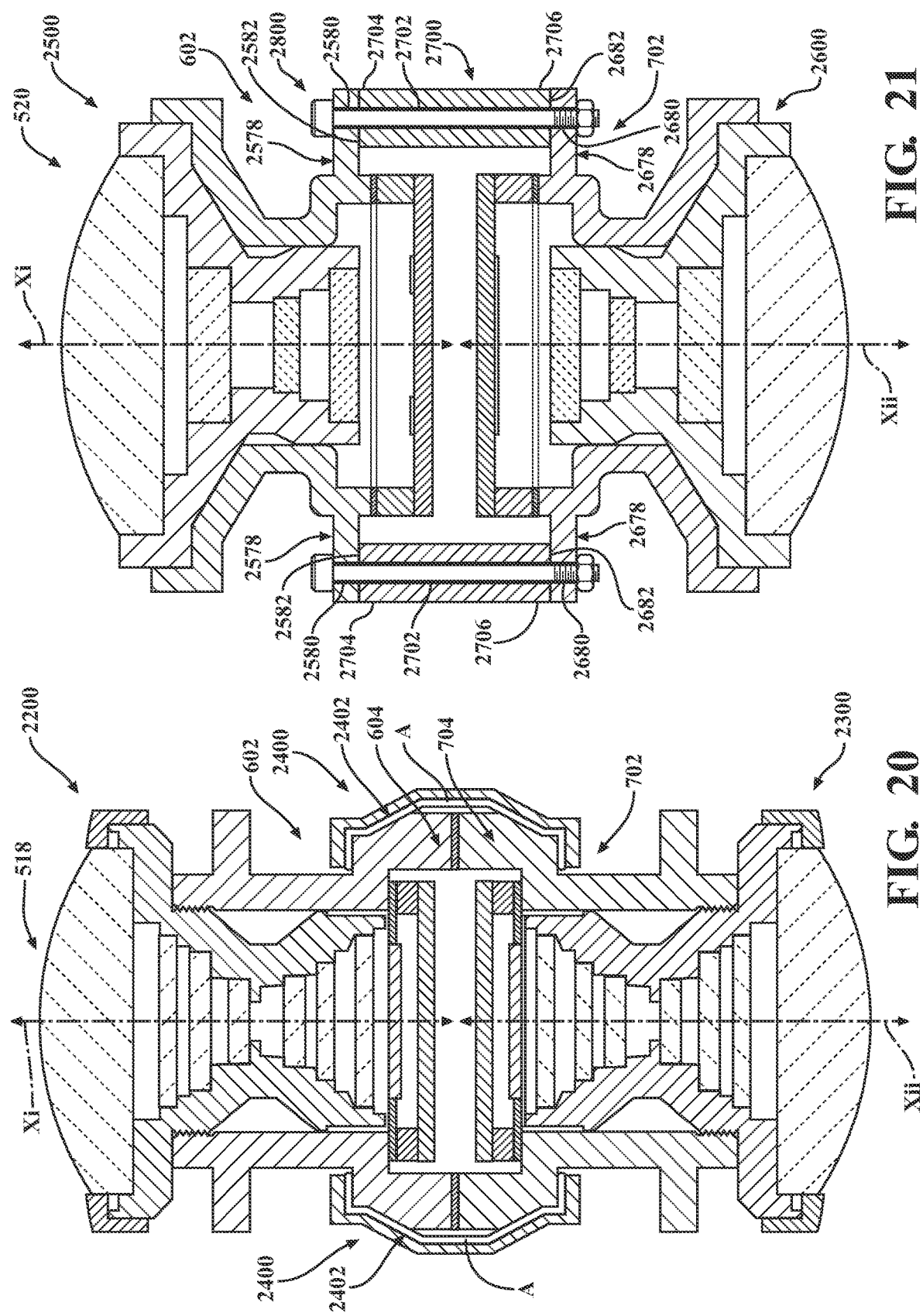

INTEGRATED SENSOR-LENS ASSEMBLY ALIGNMENT IN IMAGE CAPTURE SYSTEMS

TECHNICAL FIELD

The present disclosure relates to the alignment of integrated sensor-lens assemblies (ISLAs) in image capture systems.

BACKGROUND

Image capture systems are used in a variety of applications (e.g., handheld cameras and video recorders, cell phones, drones, vehicles, etc.) and include one or more optical elements (e.g., lenses), which capture content by receiving and focusing light, and one or more image sensors which convert the captured content into an electronic image signal that is processed by an image signal processor to form an image. In some image capture systems, the optical element(s) and the image sensor(s) are integrated into a single unit known an ISLA.

Omnidirectional (spherical) image capture systems typically include an optical module with dual ISLAs that are oriented in opposite (e.g., forward and rearward) directions. The ISLAs define overlapping fields-of-view, which allows the captured images to be stitched together during image processing to generate a single, 360 degree spherical image. In order to produce high-quality, focused images, however, the lenses and the corresponding sensor(s) must be properly aligned in multiple degrees-of-freedom, as even small misalignments (e.g., in the position or the tilt of the lenses and/or the image sensors) can negatively impact the quality of the spherical image.

To address this concern, the present disclosure describes various structures, components, and methods for aligning and connecting ISLAs in omnidirectional image capture systems.

SUMMARY

In one aspect of the present disclosure, an optical module for an image capture system is disclosed. The optical module includes a first integrated sensor-lens assembly (ISLA), which defines a first optical axis and first mounting surfaces; a second ISLA, which defines a second optical axis that is coincident with the first optical axis and second mounting surfaces; and an adhesive that is located between the first mounting surfaces and the second mounting surfaces so as to directly connect the first ISLA and the second ISLA. The first ISLA is oriented in a first direction and includes: a first lens holder; a first lens barrel that is located within the first lens holder and which houses a first optical group; and a first printed circuit board (PCB) subassembly that is supported by the first lens holder. The second ISLA is oriented in a second direction that is (generally) opposite to the first direction and includes: a second lens holder; a second lens barrel that is located within the second lens holder and which houses a second optical group; and a second PCB subassembly that is supported by the second lens holder.

In certain embodiments, the first mounting surfaces and the second mounting surfaces may extend in (generally) orthogonal relation to the first optical axis and the second optical axis.

In certain embodiments, the first mounting surfaces may be defined by the first PCB subassembly, and the second mounting surfaces may be defined by the second PCB subassembly.

In certain embodiments, the first mounting surfaces may be defined by innermost end walls of the first PCB subassembly, and the second mounting surfaces may be defined by innermost end walls of the second PCB subassembly.

In certain embodiments, the innermost end walls of the first PCB subassembly may be positioned adjacent to the innermost end walls of the second PCB subassembly.

In certain embodiments, the first mounting surfaces may be defined by the first lens holder, and the second mounting surfaces may be defined by the second lens holder.

In certain embodiments, the first mounting surfaces may be defined by innermost end walls of the first lens holder, and the second mounting surfaces may be defined by innermost end walls of the second lens holder.

In certain embodiments, the innermost end walls of the first lens holder may be positioned adjacent to the innermost end walls of the second lens holder.

In certain embodiments, the first lens holder and the second lens holder may include corresponding locating members that are associated with the first mounting surfaces and the second mounting surfaces, respectively.

In certain embodiments, the corresponding locating members may be configured to facilitate proper alignment of the first ISLA and the second ISLA during assembly of the optical module.

In certain embodiments, the first mounting surfaces and the second mounting surfaces may extend in (generally) parallel relation to the first optical axis and the second optical axis.

In certain embodiments, the first mounting surfaces may be defined by the first PCB subassembly, and the second mounting surfaces may be defined by the second PCB subassembly.

In certain embodiments, the first mounting surfaces may be defined by lateral sidewalls of the first PCB subassembly, and the second mounting surfaces may be defined by lateral sidewalls of the second PCB subassembly.

In certain embodiments, the lateral sidewalls of the first PCB subassembly may be positioned adjacent to the lateral sidewalls of the second PCB subassembly.

In certain embodiments, the first mounting surfaces may be defined by the first lens holder, and the second mounting surfaces may be defined by the second lens holder.

In certain embodiments, the first mounting surfaces may be defined by lateral sidewalls of the first lens holder, and the second mounting surfaces may be defined by lateral sidewalls of the second lens holder.

In certain embodiments, the lateral sidewalls of the first lens holder may be positioned adjacent to the lateral sidewalls of the second lens holder.

In another aspect of the present disclosure, an optical module for an image capture system is disclosed. The optical module includes: a first integrated sensor-lens assembly (ISLA) that defines a first optical axis; a second ISLA that defines a second optical axis, which is coincident with the first optical axis; and mechanical fasteners that extends through the first ISLA and the second ISLA to thereby secure the first ISLA and the second ISLA in relation to each other, wherein the first ISLA and the second ISLA are (generally) identical in configuration and are oriented in (generally) opposite directions.

In certain embodiments, the first ISLA may include a first pair of wings that extend outwardly therefrom, and the second ISLA may include a second pair of wings that extend outwardly therefrom.

In certain embodiments, the mechanical fasteners may extend through the first pair of wings and through the second pair of wings.

In certain embodiments, the optical module may further include standoffs that are located between the first ISLA and the second ISLA to thereby enhance stability of the optical module.

In certain embodiments, the mechanical fasteners may extend through the standoffs.

In certain embodiments, the optical module may further include an adhesive that is located between the first ISLA and the second ISLA to further secure the first ISLA and the second ISLA in relation to each other.

In another aspect of the present disclosure, an optical module for an image capture system is disclosed. The optical module includes: a first integrated sensor-lens assembly (ISLA) that defines a first optical axis; a second ISLA that defines a second optical axis, which is coincident with the first optical axis; and a bracket that is located externally of, and which extends between, the first ISLA and the second ISLA to thereby secure the first ISLA and the second ISLA in relation to each other, wherein the first ISLA and the second ISLA are (generally) identical in configuration and are oriented in (generally) opposite directions.

In certain embodiments, the bracket may be adhesively secured to the first ISLA and to the second ISLA.

In certain embodiments, the first ISLA may include a first lens holder having an inner end and an outer end opposite to the inner end and a first lens barrel that is located within the first lens holder and which houses a first optical group.

In certain embodiments, the second ISLA may include a second lens holder having an inner end and an outer end opposite to the inner end and a second lens barrel that is located within the second lens holder and which houses a second optical group.

In certain embodiments, the bracket may extend about the inner end of the first lens holder and about the inner end of the second lens holder.

BRIEF DESCRIPTION OF THE DRAWINGS

The present disclosure is best understood from the following detailed description when read in conjunction with the accompanying drawings. According to common practice, the various features of the drawings may not be to-scale, and the dimensions of the various features may be arbitrarily expanded or reduced. Additionally, in the interest of clarity, certain components, elements, and/or features may be omitted from certain drawings in the interest of clarity.

FIG. 20 is a transverse (e.g., horizontal) cross-sectional view of another example of the optical module seen in FIG. 5.

FIG. 21 is a transverse (e.g., horizontal) cross-sectional view of another example of the optical module seen in FIG. 5.

DETAILED DESCRIPTION

The present disclosure describes a variety of optical modules that are configured for use with an image capture system, each of which includes a first integrated sensor-lens assembly (ISLA) and a second ISLA, as well as various methods for aligning the ISLAs. The ISLAs are configured so as to define optical axes that are coincident with each other and are oriented in (generally) opposite (e.g., forward and rearward) directions. The first ISLA includes: a first lens holder; a first lens barrel that is located within the first lens holder and which houses a first optical group; and a first printed circuit board (PCB) subassembly that is supported by the first lens holder, and the second ISLA includes: a second lens holder; a second lens barrel that is located within the second lens holder and which houses a second optical group; and a second PCB subassembly that is supported by the second lens holder.

In certain embodiments, the first and second ISLAs define respective first and second mounting surfaces that are adhesively secured together so as to directly connect the first and second ISLAs. For example, it is envisioned that the first and second mounting surfaces may extend in (generally) orthogonal relation or in (generally) parallel relation to the optical axes, and that the first and second mounting surfaces may be defined by the first and second PCB subassemblies or by the first and second lens holders.

Additionally, or alternatively, it is envisioned that the ISLAs may be secured together by mechanical fasteners that extends therethrough or by one or more brackets that are located externally of, and which extends between, the ISLAs.

Figure 1A:
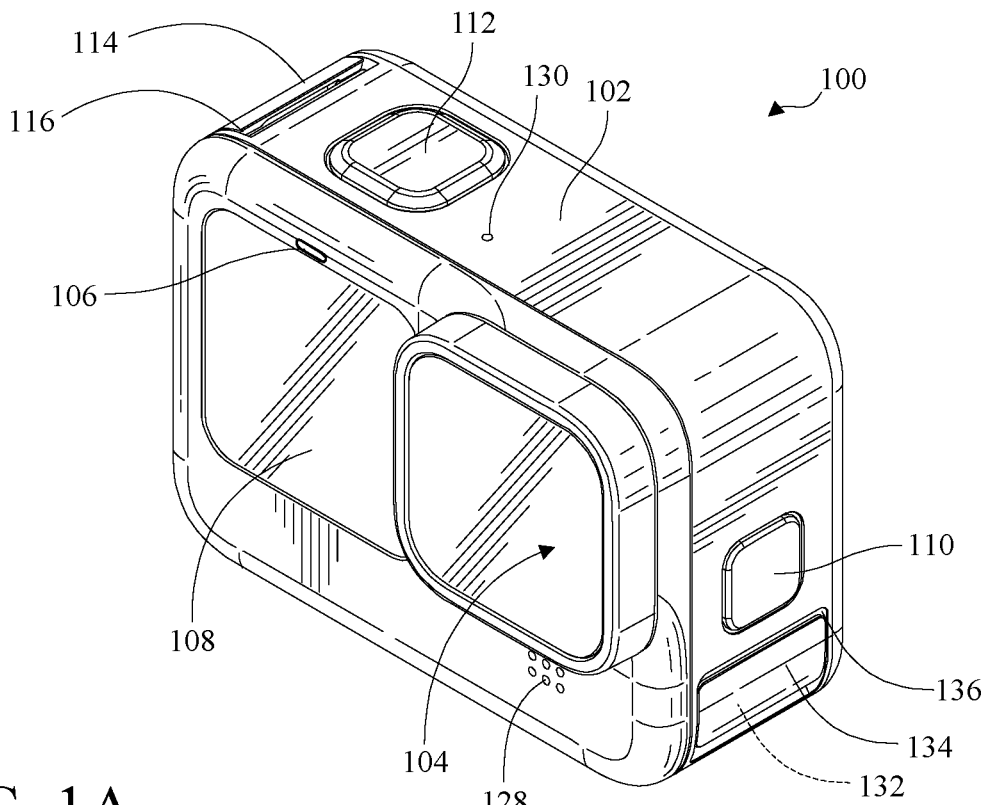
FIGS. 1A-B are isometric views of an example of an image capture system.
Figure 1B:
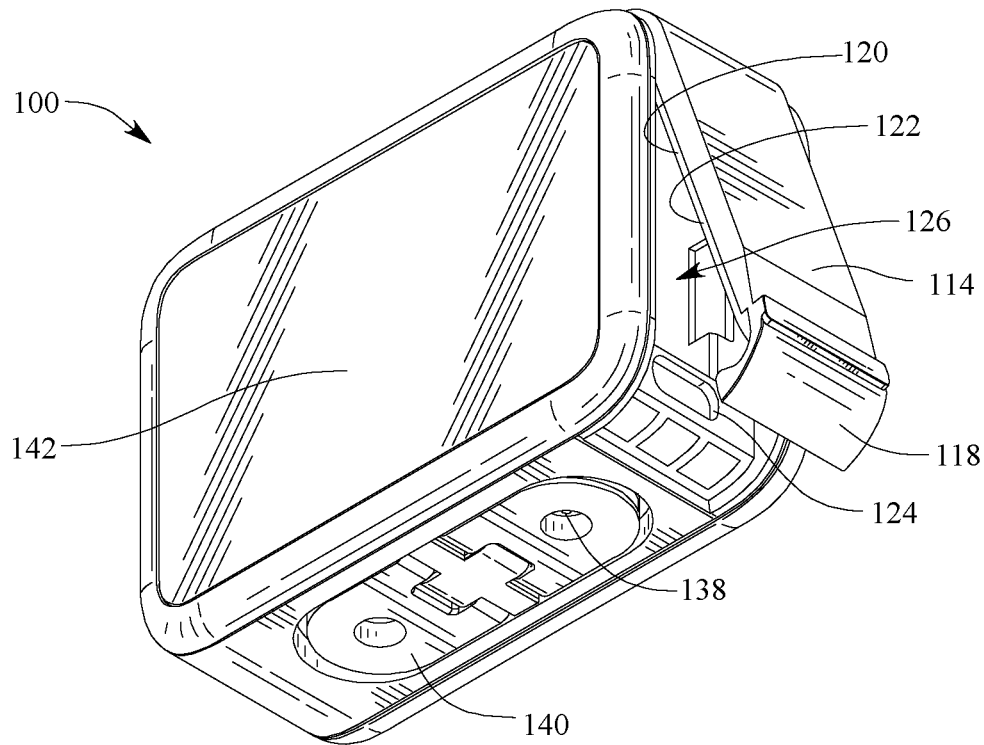

FIGS. 1A-B are isometric views of an example of an image capture system 100. The image capture system 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture system 100 includes internal electronics, such as imaging electronics, power electronics, and the like, internal to the body 102 for capturing images and performing other functions of the image capture system 100. The arrangement of the components of the image capture system 100 shown in FIGS. 1A-B is an example, other arrangements of elements may be used, except as is described herein or as is otherwise clear from context.

The body 102 of the image capture system 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture system 100 may capture one or more images, such as a sequence of images, such as video. The image capture system 100 may store the captured images and video for subsequent display, playback, or transfer to an external device. Although one image capture device 104 is shown in FIG. 1A, the image capture system 100 may include multiple image capture devices, which may be structured on respective surfaces of the body 102.

As shown in FIG. 1A, the image capture system 100 includes the indicator 106 structured on the front surface of the body 102. The indicator 106 may output, or emit, visible light, such as to indicate a status of the image capture system 100. For example, the indicator 106 may be a light-emitting diode (LED). Although one indicator 106 is shown in FIG. 1A, the image capture system 100 may include multiple indictors structured on respective surfaces of the body 102.

As shown in FIG. 1A, the image capture system 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture system 100. In some implementations, the display 108 may be omitted or combined with another component of the image capture system 100.

As shown in FIG. 1A, the image capture system 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture system 100 may include multiple mode, or configuration, buttons structured on respective surfaces of the body 102. In some implementations, the mode button 110 may be omitted or combined with another component of the image capture system 100. For example, the display 108 may be an interactive, such as touchscreen, display, and the mode button 110 may be physically omitted and functionally combined with the display 108.

As shown in FIG. 1A, the image capture system 100 includes the shutter button 112 structured on a top surface of the body 102. The shutter button 112 may be another type of input device, such as a switch, a toggle, a slider, or a dial. The image capture system 100 may include multiple shutter buttons structured on respective surfaces of the body 102. In some implementations, the shutter button 112 may be omitted or combined with another component of the image capture system 100.

The mode button 110, the shutter button 112, or both, obtain input data, such as user input data in accordance with user interaction with the image capture system 100. For example, the mode button 110, the shutter button 112, or both, may be used to turn the image capture system 100 on and off, scroll through modes and settings, and select modes and change settings.

As shown in FIG. 1B, the image capture system 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture system 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture system 100 includes the battery receptacle 126 structured to form a portion of an interior surface of the body 102. The battery receptacle 126 includes operative connections for power transfer between the battery and the image capture system 100. In some implementations, the battery receptable 126 may be omitted. The image capture system 100 may include multiple battery receptacles.

As shown in FIG. 1A, the image capture system 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture system 100. The image capture system 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture system 100.

As shown in FIG. 1B, the image capture system 100 includes the speaker 138 structured on a bottom surface of the body 102. The speaker 138 outputs or presents audio, such as by playing back recorded audio or emitting sounds associated with notifications. The image capture system 100 may include multiple speakers structured on respective surfaces of the body 102.

As shown in FIG. 1B, the image capture system 100 includes the interconnect mechanism 140 structured on a bottom surface of the body 102. The interconnect mechanism 140 removably connects the image capture system 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture system 100 may include multiple interconnect mechanisms structured on, or forming a portion of, respective surfaces of the body 102. In some implementations, the interconnect mechanism 140 may be omitted.

As shown in FIG. 1B, the image capture system 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture system 100. The image capture system 100 may include multiple displays structured on respective surfaces of the body 102, such as the displays 108, 142 shown in FIGS. 1A-1B. In some implementations, the display 142 may be omitted or combined with another component of the image capture system 100.

The image capture system 100 may include features or components other than those described herein, such as other buttons or interface features. In some implementations, interchangeable lenses, cold shoes, and hot shoes, or a combination thereof, may be coupled to or combined with the image capture system 100. For example, the image capture system 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture system 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture system 100 via the computing communication link, or receive user input and communicate information with the image capture system 100 via the computing communication link. The external user interface device may implement or execute one or more applications to manage or control the image capture system 100. For example, the external user interface device may include an application for controlling camera configuration, video acquisition, video display, or any other configurable or controllable aspect of the image capture system 100. In some implementations, the external user interface device may generate and share, such as via a cloud-based or social media service, one or more images or video clips. In some implementations, the external user interface device may display unprocessed or minimally processed images or video captured by the image capture system 100 contemporaneously with capturing the images or video by the image capture system 100, such as for shot framing or live preview.

Figure 2A:
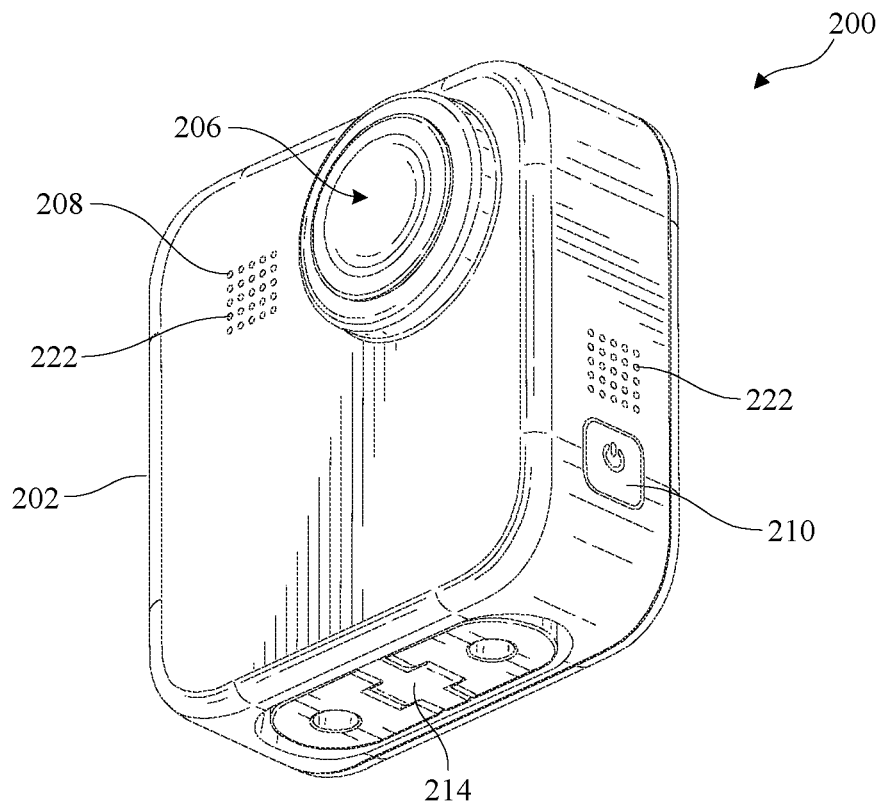
FIGS. 2A-B are isometric views of another example of an image capture system.
Figure 2B:
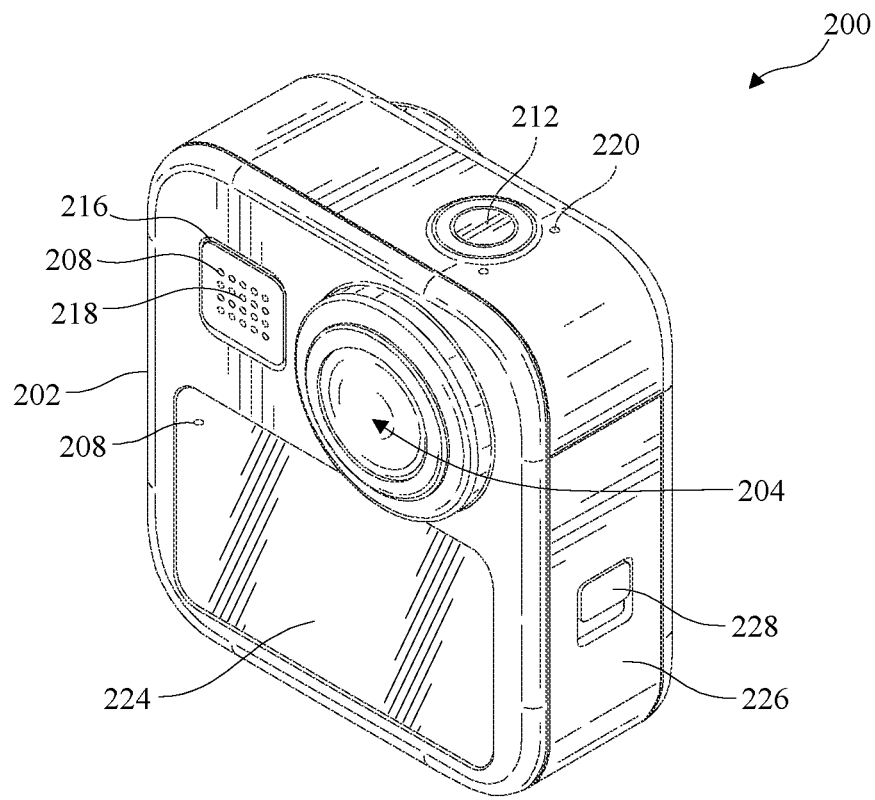

FIGS. 2A-2B illustrate another example of an image capture system 200. The image capture system 200 is similar to the image capture system 100 shown in FIGS. 1A-1B. The image capture system 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture system 200 shown in FIGS. 2A-2B is an example, other arrangements of elements may be used.

The body 202 of the image capture system 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture system 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture system 200 may include other image capture devices structured on respective surfaces of the body 202.

As shown in FIG. 2B, the image capture system 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture system 200 may include other indictors structured on respective surfaces of the body 202.

As shown in FIGS. 2A-B, the image capture system 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

Figure 4:
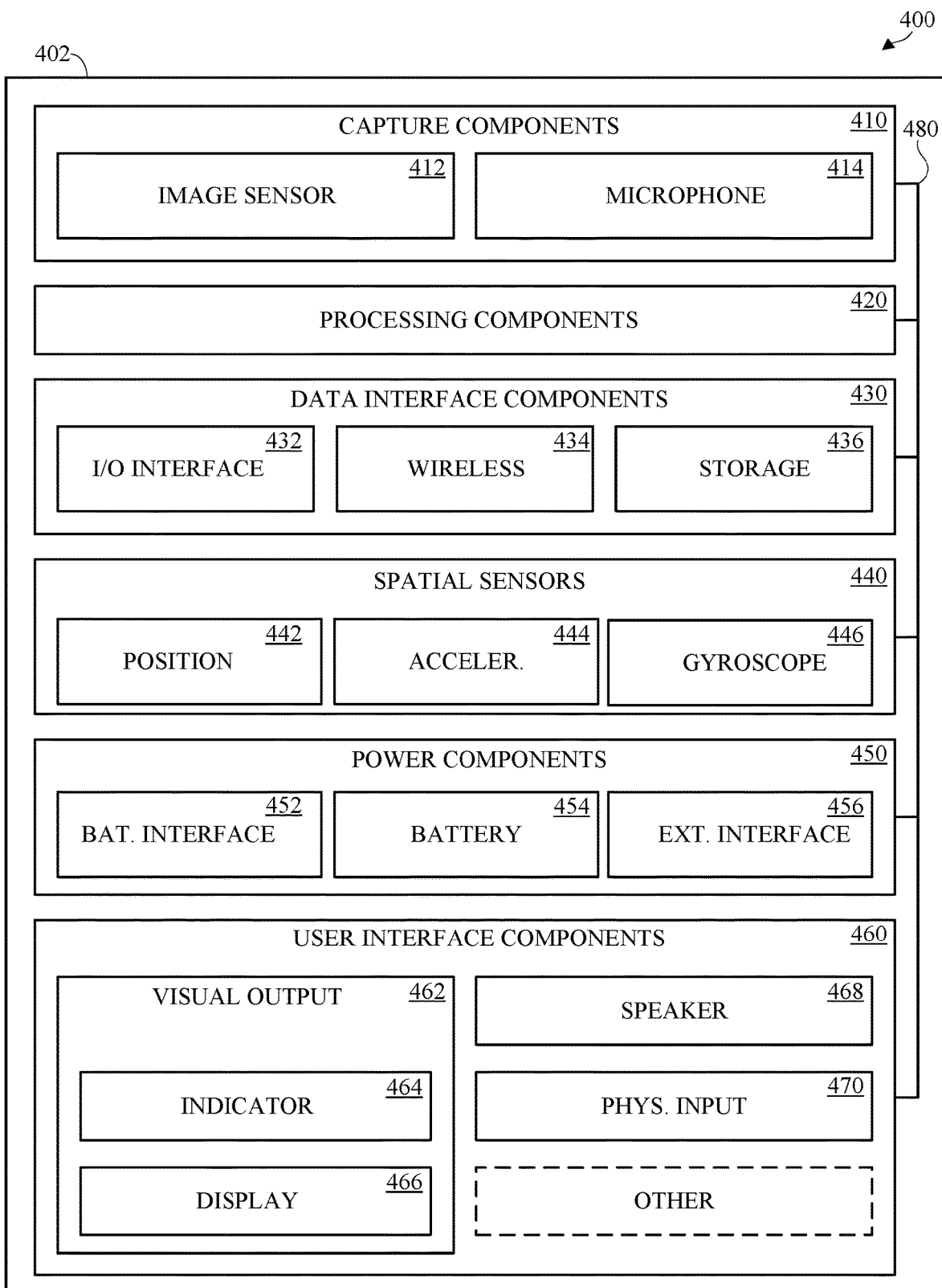
FIG. 4 is a block diagram of electronic components of an image capture system.

The image capture system 200 includes internal electronics (not expressly shown), such as imaging electronics, power electronics, and the like, internal to the body 202 for capturing images and performing other functions of the image capture system 200. An example showing internal electronics is shown in FIG. 4.

As shown in FIGS. 2A-2B, the image capture system 200 includes the interconnect mechanism 214 structured on a bottom surface of the body 202. The interconnect mechanism 214 may be similar to the interconnect mechanism 140 shown in FIG. 1B.

As shown in FIG. 2B, the image capture system 200 includes the drainage channel 216 for draining liquid from audio components of the image capture system 200.

As shown in FIGS. 2A-2B, the image capture system 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture system 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture system 200 may include multiple displays structured on respective surfaces of the body 202. In some implementations, the display 224 may be omitted or combined with another component of the image capture system 200.

As shown in FIG. 2B, the image capture system 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture system 200 may include features or components other than those described herein, some features or components described herein may be omitted, or some features or components described herein may be combined. For example, the image capture system 200 may include additional interfaces or different interface features, interchangeable lenses, cold shoes, or hot shoes.

Figure 3:
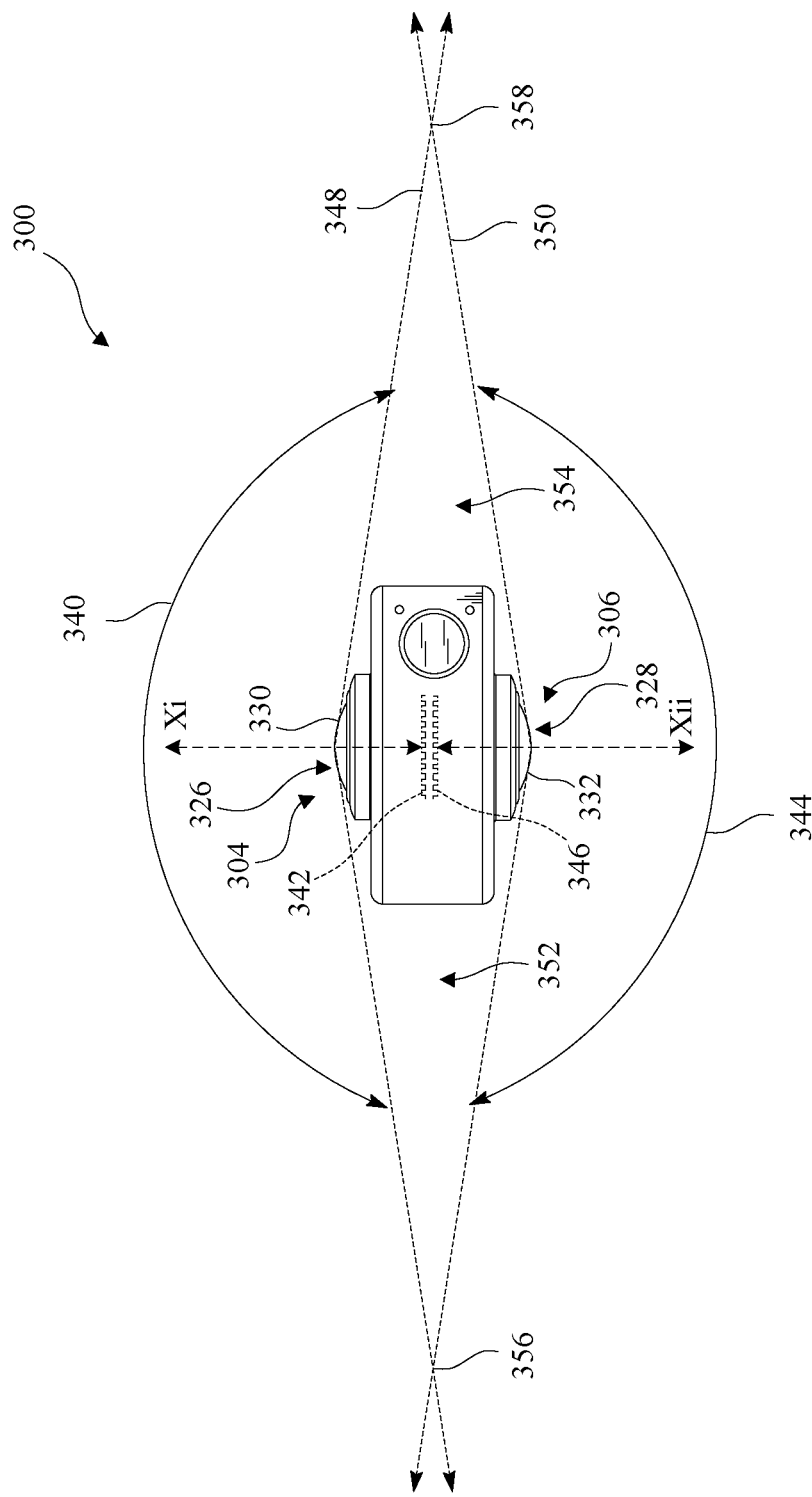
FIG. 3 is a top view of another example of an image capture system.

FIG. 3 is a top view of an image capture system 300. The image capture system 300 is similar to the image capture system 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture system 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342. In the illustrated embodiment, the first lens 330 and the first image sensor 342 are integrated into a single unit, whereby the first image capture device 304 is configured as a first ISLA 326 that defines a first optical axis Xi.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346. In the illustrated embodiment, the second lens 332 and the second image sensor 346 are integrated into a single unit, whereby the second image capture device 306 is configured as a second ISLA 328 that defines a second optical axis Xii.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions (e.g., a forward direction and a rearward direction), and such that the image capture system 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture system 300, may be obscured from the lenses 330, 332 and the corresponding image sensors 342, 346, such that content corresponding to the uncaptured areas 352, 354 may be omitted from images captured by the image capture system 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture system 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The ISLAs 326, 328 (e.g., the lenses 330, 332) may be aligned along an axis X as shown (e.g., such that the optical axes Xi, Xii are coincident with each other and with the axis X), laterally offset from each other (not shown), off-center from a central axis of the image capture system 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

FIG. 4 is a block diagram of electronic components in an image capture system 400. The image capture system 400 may be a single-lens image capture system, a multi-lens image capture system, or variations thereof, including an image capture system with multiple capabilities such as the use of interchangeable ISLAs. Components, such as electronic components, of the image capture system 100 shown in FIGS. 1A-B, the image capture system 200 shown in FIGS. 2A-B, or the image capture system 300 shown in FIG. 3, may be implemented as shown in FIG. 4.

The image capture system 400 includes a body 402. The body 402 may be similar to the body 102 shown in FIGS. 1A-1B or the body 202 shown in FIGS. 2A-2B. The body 402 includes electronic components such as capture components 410, processing components 420, data interface components 430, spatial sensors 440, power components 450, user interface components 460, and a bus 480.

The capture components 410 include an image sensor 412 for capturing images. Although one image sensor 412 is shown in FIG. 4, the capture components 410 may include multiple image sensors. The image sensor 412 may be similar to the image sensors 342, 346 shown in FIG. 3. The image sensor 412 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 412 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 412 captures detected light as image data and conveys the captured image data as electrical signals (image signals or image data) to the other components of the image capture system 400, such as to the processing components 420, such as via the bus 480.

The capture components 410 include a microphone 414 for capturing audio. Although one microphone 414 is shown in FIG. 4, the capture components 410 may include multiple microphones. The microphone 414 detects and captures, or records, sound, such as sound waves incident upon the microphone 414. The microphone 414 may detect, capture, or record sound in conjunction with capturing images by the image sensor 412. The microphone 414 may detect sound to receive audible commands to control the image capture system 400. The microphone 414 may be similar to the microphones 128, 130, 132 shown in FIGS. 1A-1B or the audio components 218, 220, 222 shown in FIGS. 2A-2B.

The processing components 420 perform image signal processing, such as filtering, tone mapping, or stitching, to generate, or obtain, processed images, or processed image data, based on image data obtained from the image sensor 412. The processing components 420 may include one or more processors having single or multiple processing cores. In some implementations, the processing components 420 may include, or may be, an application specific integrated circuit (ASIC) or a digital signal processor (DSP). For example, the processing components 420 may include a custom image signal processor. The processing components 420 conveys data, such as processed image data, with other components of the image capture system 400 via the bus 480. In some implementations, the processing components 420 may include an encoder, such as an image or video encoder that may encode, decode, or both, the image data, such as for compression coding, transcoding, or a combination thereof.

Although not shown expressly in FIG. 4, the processing components 420 may include memory, such as a random-access memory (RAM) device, which may be non-transitory computer-readable memory. The memory of the processing components 420 may include executable instructions and data that can be accessed by the processing components 420.

The data interface components 430 communicates with other, such as external, electronic devices, such as a remote control, a smartphone, a tablet computer, a laptop computer, a desktop computer, or an external computer storage device. For example, the data interface components 430 may receive commands to operate the image capture system 400. In another example, the data interface components 430 may transmit image data to transfer the image data to other electronic devices. The data interface components 430 may be configured for wired communication, wireless communication, or both. As shown, the data interface components 430 include an I/O interface 432, a wireless data interface 434, and a storage interface 436. In some implementations, one or more of the I/O interface 432, the wireless data interface 434, or the storage interface 436 may be omitted or combined.

The I/O interface 432 may send, receive, or both, wired electronic communications signals. For example, the I/O interface 432 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 432 is shown in FIG. 4, the data interface components 430 include multiple I/O interfaces. The I/O interface 432 may be similar to the data interface 124 shown in FIG. 1B.

The wireless data interface 434 may send, receive, or both, wireless electronic communications signals. The wireless data interface 434 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 434 is shown in FIG. 4, the data interface components 430 include multiple wireless data interfaces. The wireless data interface 434 may be similar to the data interface 124 shown in FIG. 1B.

The storage interface 436 may include a memory card connector, such as a memory card receptacle, configured to receive and operatively couple to a removable storage device, such as a memory card, and to transfer, such as read, write, or both, data between the image capture system 400 and the memory card, such as for storing images, recorded audio, or both captured by the image capture system 400 on the memory card. Although one storage interface 436 is shown in FIG. 4, the data interface components 430 include multiple storage interfaces. The storage interface 436 may be similar to the data interface 124 shown in FIG. 1B.

The spatial, or spatiotemporal, sensors 440 detect the spatial position, movement, or both, of the image capture system 400. As shown in FIG. 4, the spatial sensors 440 include a position sensor 442, an accelerometer 444, and a gyroscope 446. The position sensor 442, which may be a global positioning system (GPS) sensor, may determine a geospatial position of the image capture system 400, which may include obtaining, such as by receiving, temporal data, such as via a GPS signal. The accelerometer 444, which may be a three-axis accelerometer, may measure linear motion, linear acceleration, or both of the image capture system 400. The gyroscope 446, which may be a three-axis gyroscope, may measure rotational motion, such as a rate of rotation, of the image capture system 400. In some implementations, the spatial sensors 440 may include other types of spatial sensors. In some implementations, one or more of the position sensor 442, the accelerometer 444, and the gyroscope 446 may be omitted or combined.

The power components 450 distribute electrical power to the components of the image capture system 400 for oper-ating the image capture system 400. As shown in FIG. 4, the power components 450 include a battery interface 452, a battery 454, and an external power interface 456 (ext. interface). The battery interface 452 (bat. interface) operatively couples to the battery 454, such as via conductive contacts to transfer power from the battery 454 to the other electronic components of the image capture system 400. The battery interface 452 may be similar to the battery receptacle 126 shown in FIG. 1B. The external power interface 456 obtains or receives power from an external source, such as a wall plug or external battery, and distributes the power to the components of the image capture system 400, which may include distributing power to the battery 454 via the battery interface 452 to charge the battery 454. Although one battery interface 452, one battery 454, and one external power interface 456 are shown in FIG. 4, any number of battery interfaces, batteries, and external power interfaces may be used. In some implementations, one or more of the battery interface 452, the battery 454, and the external power interface 456 may be omitted or combined. For example, in some implementations, the external interface 456 and the I/O interface 432 may be combined.

The user interface components 460 receive input, such as user input, from a user of the image capture system 400, output, such as display or present, information to a user, or both receive input and output information, such as in accordance with user interaction with the image capture system 400.

As shown in FIG. 4, the user interface components 460 include visual output components 462 to visually communicate information, such as to present captured images. As shown, the visual output components 462 include an indicator 464 and a display 466. The indicator 464 may be similar to the indicator 106 shown in FIG. 1A or the indicators 208 shown in FIGS. 2A-2B. The display 466 may be similar to the display 108 shown in FIG. 1A, the display 142 shown in FIG. 1B, or the display 224 shown in FIG. 2B. Although the visual output components 462 are shown in FIG. 4 as including one indicator 464, the visual output components 462 may include multiple indicators. Although the visual output components 462 are shown in FIG. 4 as including one display 466, the visual output components 462 may include multiple displays. In some implementations, one or more of the indicators 464 or the display 466 may be omitted or combined.

As shown in FIG. 4, the user interface components 460 include a speaker 468. The speaker 468 may be similar to the speaker 138 shown in FIG. 1B or the audio components 218, 220, 222 shown in FIGS. 2A-2B. Although one speaker 468 is shown in FIG. 4, the user interface components 460 may include multiple speakers. In some implementations, the speaker 468 may be omitted or combined with another component of the image capture system 400, such as the microphone 414.

As shown in FIG. 4, the user interface components 460 include a physical input interface 470. The physical input interface 470 may be similar to the mode buttons 110, 210 shown in FIGS. 1A, 2A or the shutter buttons 112, 212 shown in FIGS. 1A, 2B. Although one physical input interface 470 is shown in FIG. 4, the user interface components 460 may include multiple physical input interfaces. In some implementations, the physical input interface 470 may be omitted or combined with another component of the image capture system 400. The physical input interface 470 may be, for example, a button, a toggle, a switch, a dial, or a slider.

As shown in FIG. 4, the user interface components 460 include a broken line border box labeled "other" to indicate that components of the image capture system 400 other than the components expressly shown as included in the user interface components 460 may be user interface components. For example, the microphone 414 may receive, or capture, and process audio signals to obtain input data, such as user input data corresponding to voice commands. In another example, the image sensor 412 may receive, or capture, and process image data to obtain input data, such as user input data corresponding to visible gesture commands. In another example, one or more of the spatial sensors 440, such as a combination of the accelerometer 444 and the gyroscope 446, may receive, or capture, and process motion data to obtain input data, such as user input data corresponding to motion gesture commands.

Figure 5:
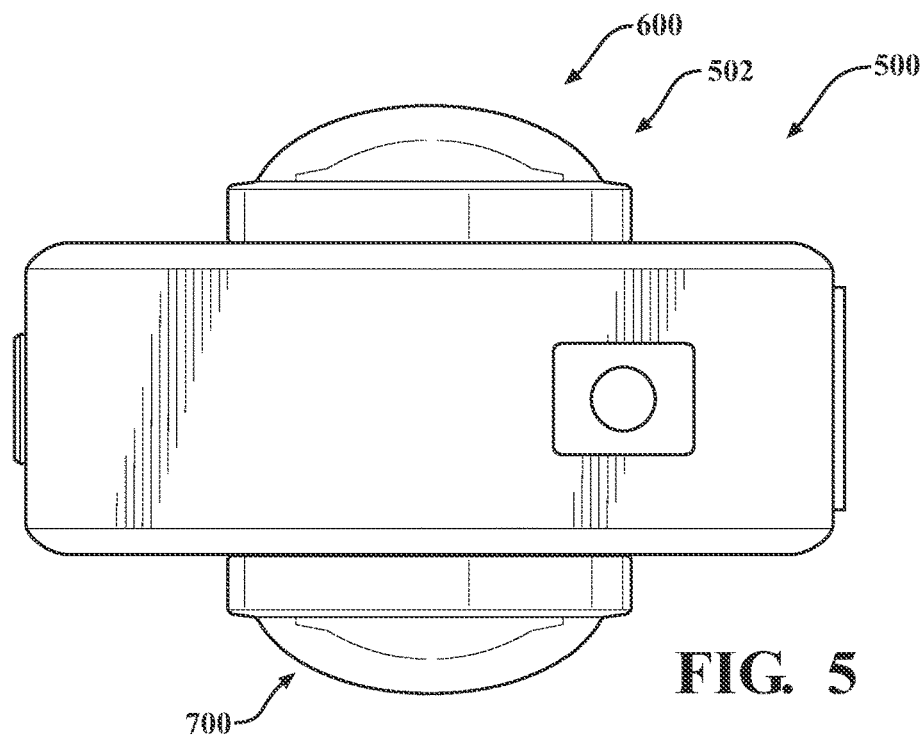
FIG. 5 is a top, plan view of another example of an image capture system including an optical module with a first integrated sensor-lens assembly (ISLA) and a second ISLA.
Figure 6:
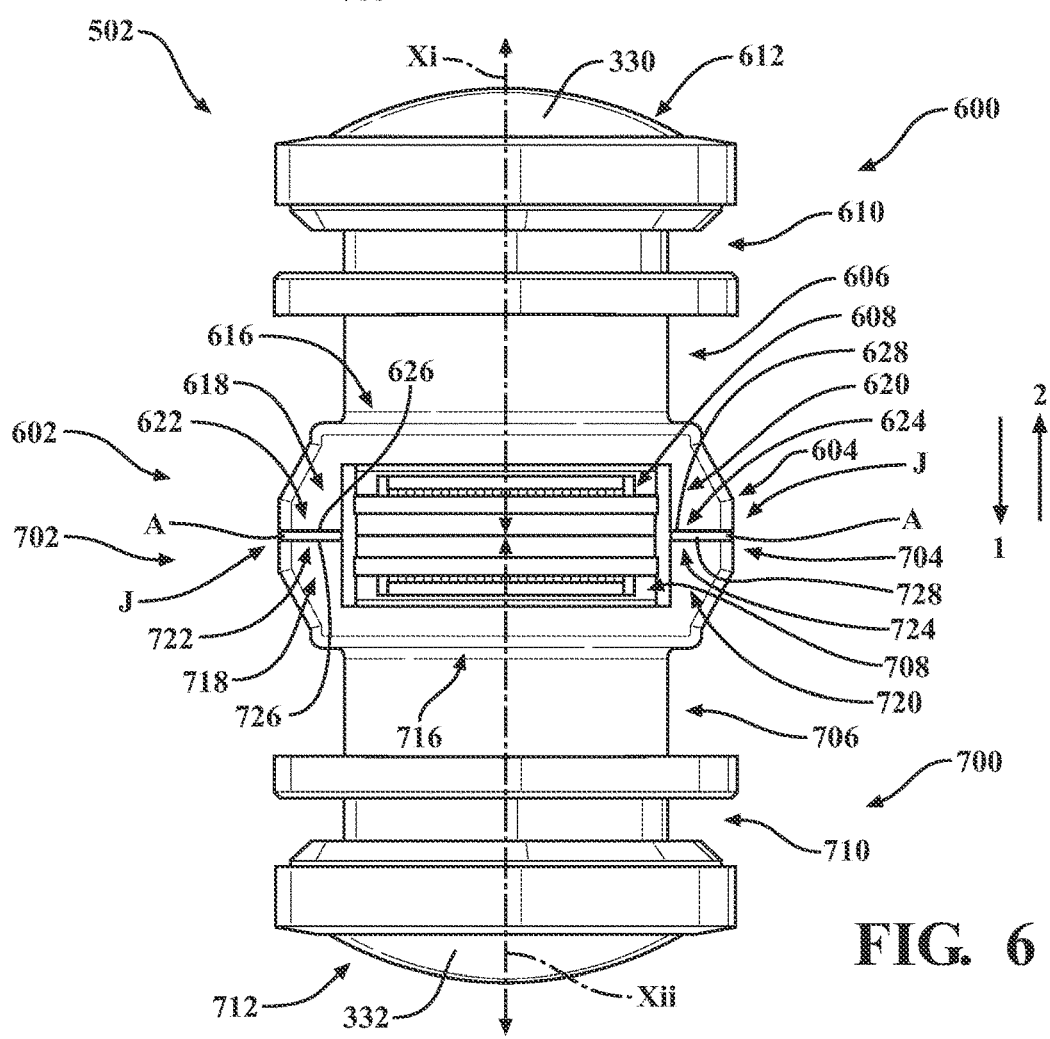
FIG. 6 is a top, plan view of the optical module seen in FIG. 5 shown separated from the image capture system.
Figure 7:
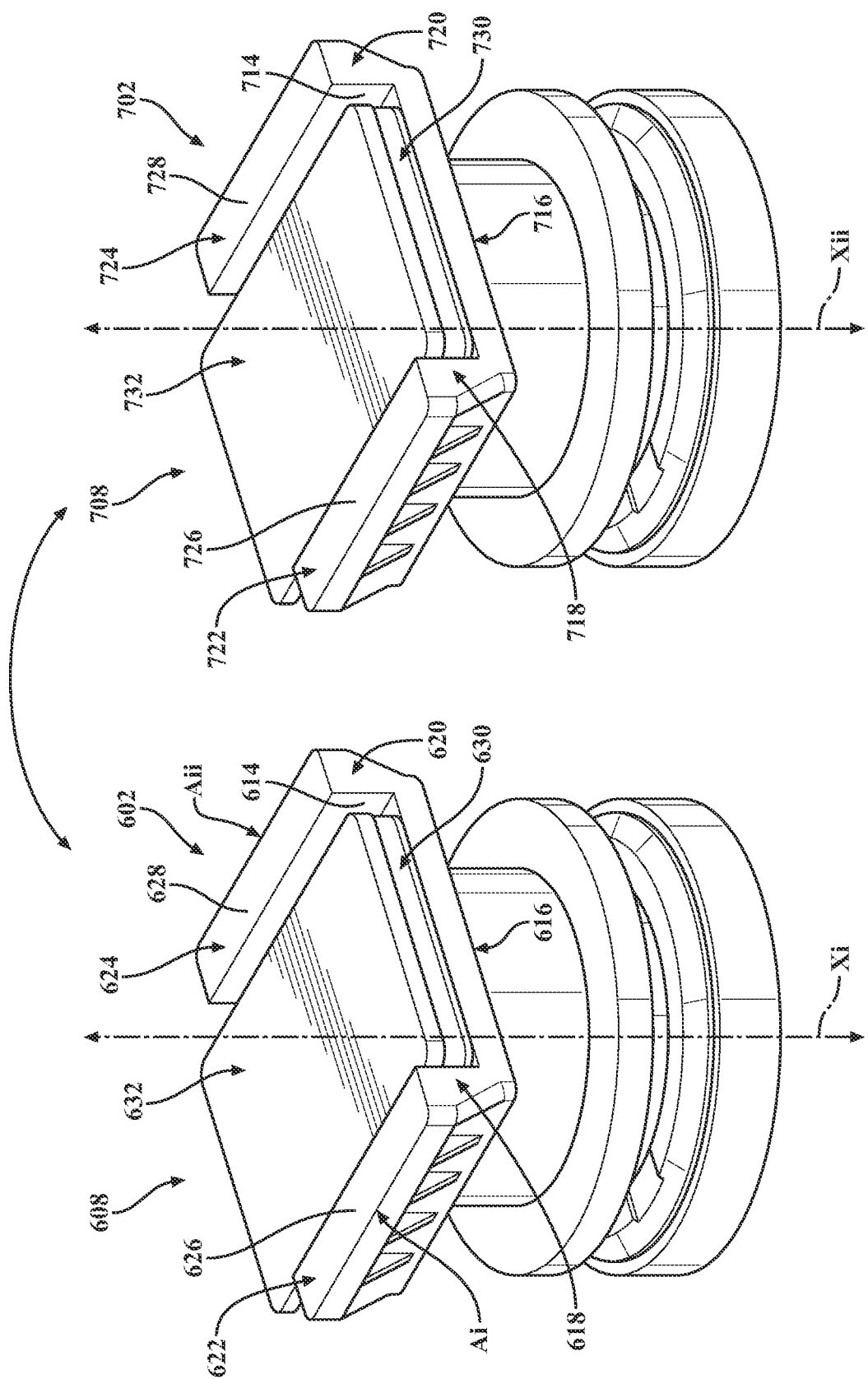
FIG. 7 is an inner (bottom) perspective view of the optical module seen in FIG. 5 with the first and second ISLAs shown separated.

With reference now to FIGS. 5-7, another example of an omnidirectional (spherical) image capture system will be discussed, which is identified by the reference character 500, that includes an optical module 502 with respective first and second ISLAs 600, 700 that are directly connected (secured) together and which are (generally) identical in configuration. More specifically, FIG. 5 is a top, plan view of the image capture system 500; FIG. 6 is a top, plan view of the optical module 502 shown separated from the image capture system 500; and FIG. 7 is an inner (bottom) perspective view of the optical module 502 with the ISLAs 600, 700 shown separated. The image capture system 500 includes features similar to the aforedescribed image capture system 300 (FIG. 3) in particular, as well as the image capture systems 100 (FIGS. 1A, 1B), 200 (FIGS. 2A, 2B), and 400 (FIG. 4) and, accordingly, will only be discussed with respect to differences therefrom in the interest of brevity. As such, identical reference characters will be utilized to refer to elements, structures, features, etc., common to the image capture systems 100, 200, 300, 400, 500.

The ISLA 600 includes: a (first) lens holder (mount) 602 having an inner end 604 and an outer end 606 that is opposite to the inner end 604; a (first) printed circuit board (PCB) subassembly 608; and a (first) lens barrel 610, which houses (includes, accommodates) a (first) optical group 612 that includes the first lens(es) 330 (or other such optical elements) and receives and directs light onto the image sensor(s) 342 (FIG. 3). As seen in FIG. 6, the lens holder 602, the PCB subassembly 608, and the lens barrel 610 are arranged concentrically in relation to each other (e.g., along the optical axis Xi defined by the ISLA 600).

The lens holder 602 is symmetrical about the optical axis Xi and includes a (generally) U-shaped cross-sectional configuration that defines a chamber 614 (FIG. 7), which is configured to receive the PCB subassembly 608. The lens holder 602 includes a backspan 616, which extends in (generally) orthogonal relation to the optical axis Xi, and a pair of (generally) identical legs 618, 620, which extend from the backspan 616 in (generally) orthogonal relation thereto. As seen in FIG. 7, the legs 618, 620 include innermost end walls 622, 624 defining mounting surfaces 626, 628, respectively, that are (generally) planar (e.g., flat) and (generally) uniform in configuration. More specifically, the mounting surfaces 626, 628 extend in (generally) orthogonal relation to the optical axis Xi and are oriented in a rearward direction 1 as shown in FIG. 6 (e.g., away from the first lens 330 and towards the second lens 332).

In the illustrated embodiment, the lens holder 602 is configured such that the mounting surfaces 626, 628 each define a (generally equivalent) surface area Ai that lies (substantially) within the range of (approximately) 25 mm$^2$ to (approximately) 75 mm$^2$. It is also envisioned, however, that the lens holder 602 may be configured such that the surface area Ai defined by each of the mounting surfaces 626, 628 lies outside the disclosed range. As such, embodiments in which the surface areas Ai may be less than (approximately) 25 mm$^2$ or greater than (approximately) 75 mm$^2$ are also envisioned herein and would not be beyond the scope of the present disclosure.

The PCB subassembly 608 is supported by (e.g., connected to, engaged with) the lens holder 602 (e.g., within the chamber 614) and includes: a (first) printed circuit board (PCB) 630, which supports the image sensor(s) 342 (FIG. 3); and a (first) cover glass holder 632. The PCB assembly 630 creates a reference plane for the image sensor(s) 342 that is (generally) parallel in relation thereto so as to reduce errors during alignment and assembly of the ISLA 600.

The lens barrel 610 is located within, and is secured to, the lens holder 602 such that the lens barrel 610 and the optical group 612 are fixed in relation thereto. For example, it is envisioned that the lens barrel 610 may be adhesively secured (connected) to the lens holder 602 and/or that the lens barrel 610 may be mechanically secured (connected) to the lens holder 602 (e.g., via one or more mechanical fasteners).

With continued reference to FIGS. 5-7, the ISLA 700 includes: a (second) lens holder (mount) 702 having an inner end 704 and an outer end 706 that is opposite to the inner end 704; a (second) printed circuit board (PCB) subassembly 708; and a (second) lens barrel 710, which houses (includes, accommodates) a (second) optical group 712 that includes the second lens(es) 332 (or other such optical elements) and receives and directs light onto the image sensor(s) 346 (FIG. 3). As seen in FIG. 6, the lens holder 702, the PCB subassembly 708, and the lens barrel 710 are arranged concentrically in relation to each other (e.g., along the optical axis Xii defined by the ISLA 700).

The lens holder 702 is symmetrical about the optical axis Xii and includes a (generally) U-shaped cross-sectional configuration that defines a chamber 714 (FIG. 7), which is configured to receive the PCB subassembly 708. The lens holder 702 includes a backspan 716, which extends in (generally) orthogonal relation to the optical axis Xii, and a pair of (generally) identical legs 718, 720, which extend from the backspan 716 in (generally) orthogonal relation thereto. As seen in FIG. 7, the legs 718, 720 include innermost end walls 722, 724 defining mounting surfaces 726, 728, respectively, that are (generally) planar (e.g., flat) and (generally) uniform in configuration. More specifically, the mounting surfaces 726, 728 extend in (generally) orthogonal relation to the optical axis Xii and are oriented in a forward direction 2 (e.g., away from the second lens 332 and towards the first lens 330).

In the illustrated embodiment, the lens holder 702 is configured such that the mounting surfaces 726, 728 each define a (generally equivalent) surface area Aii that lies (substantially) within the range of (approximately) 25 mm$^2$ to (approximately) 75 mm$^2$. It is also envisioned, however, that the lens holder 702 may be configured such that the surface area Aii defined by each of the mounting surfaces 726, 728 lies outside the disclosed range. As such, embodiments in which the surface areas Aii may be less than (approximately) 25 mm$^2$ or greater than (approximately) 75 mm$^2$ are also envisioned herein and would not be beyond the scope of the present disclosure.

The PCB subassembly 708 is supported by (e.g., connected to, engaged with) the lens holder 702 (e.g., within the chamber 714) and includes: a (second) printed circuit board (PCB) 730, which supports the image sensor(s) 346 (FIG. 3); and a (sensor) cover glass holder 732. The PCB 730 creates a reference plane for the image sensor(s) 346 that is (generally) parallel in relation thereto so as to reduce errors during alignment and assembly of the ISLA 700.

The lens barrel 710 is located within, and is secured to, the lens holder 702 such that the lens barrel 710 and the optical group 712 are fixed in relation thereto. For example, it is envisioned that the lens barrel 710 may be adhesively secured (connected) to the lens holder 702 and/or that the lens barrel 710 may be mechanically secured (connected) to the lens holder 702 (e.g., via one or more mechanical fasteners).

During assembly of the optical module 502, an adhesive A (FIG. 6) is applied to the lens holders 602, 702 such that the adhesive A is located between the mounting surfaces 626, 726 and between the mounting surfaces 628, 728, respectively, and the ISLAs 600, 700 are then actively aligned. More specifically, the ISLAs 600, 700 are positioned such that optical axes Xi, Xii are coincident with each other, which may be facilitated by the placement of shims (or other such spacers) between the ISLAs 600, 700 (e.g., between the lens holders 602, 702).

In order to facilitate active alignment of the ISLAs 600, 700, it is envisioned that a camera-based vision system (e.g., a charge coupled device) may be utilized to align the mounting surfaces 626, 628 with the mounting surfaces 726, 728, respectively, using visual reference points. Additionally, or alternatively, an alignment fixture (e.g., an external tool) may be utilized to align the ISLAs 600, 700 via contact therewith at various touch-off points.

In order to facilitate assembly of the optical module 502 and account for manufacturing tolerances, it is envisioned that the ISLAs 600, 700 may be configured to define one or more gaps therebetween along one or more axes, which may be filled with variable quantities of the adhesive A during connection of the ISLAs 600, 700 in order to further enhance the alignment thereof. It should be appreciated, however, that such gapping may also be eliminated in certain embodiments without departing from the scope of the present disclosure.

Following the application of the adhesive A to the mounting surfaces 626, 628, 726, 728 and alignment of the ISLAs 600, 700, the ISLAs 600, 700 are directly connected together, which eliminates the presence of intervening structures or components, other than the adhesive A, that may otherwise be located therebetween. More specifically, the lens holders 602, 702 are positioned such that the innermost end walls 622, 624 (e.g., of the mounting surfaces 626, 628) are adjacent to (e.g., are in direct contact (engagement) with) the innermost end walls 722, 724 (e.g., of the mounting surfaces 726, 728), respectively, and the optical module 502 is subjected to a curing procedure.

As the adhesive A cures, adhesive joints J (FIG. 6) are formed, which extend in (generally) orthogonal relation to the optical axes Xi, Xii and directly and fixedly connect the ISLAs 600, 700 so as to inhibit (if not entirely prevent) relative movement therebetween, thereby maintaining alignment of the ISLAs 600, 700. For example, in one method of assembly, the optical module 502 is exposed to a UV light source during an initial cure, after which, the optical module 502 is placed into a thermal (heating) apparatus to perform a final cure, thereby fixing the connection between the ISLAs 600, 700.

Following the curing procedure, the assembled optical module 502 is allowed to cool, and the optical module 502 is cleaned (e.g., using a plasma cleaning procedure).

Figure 8:
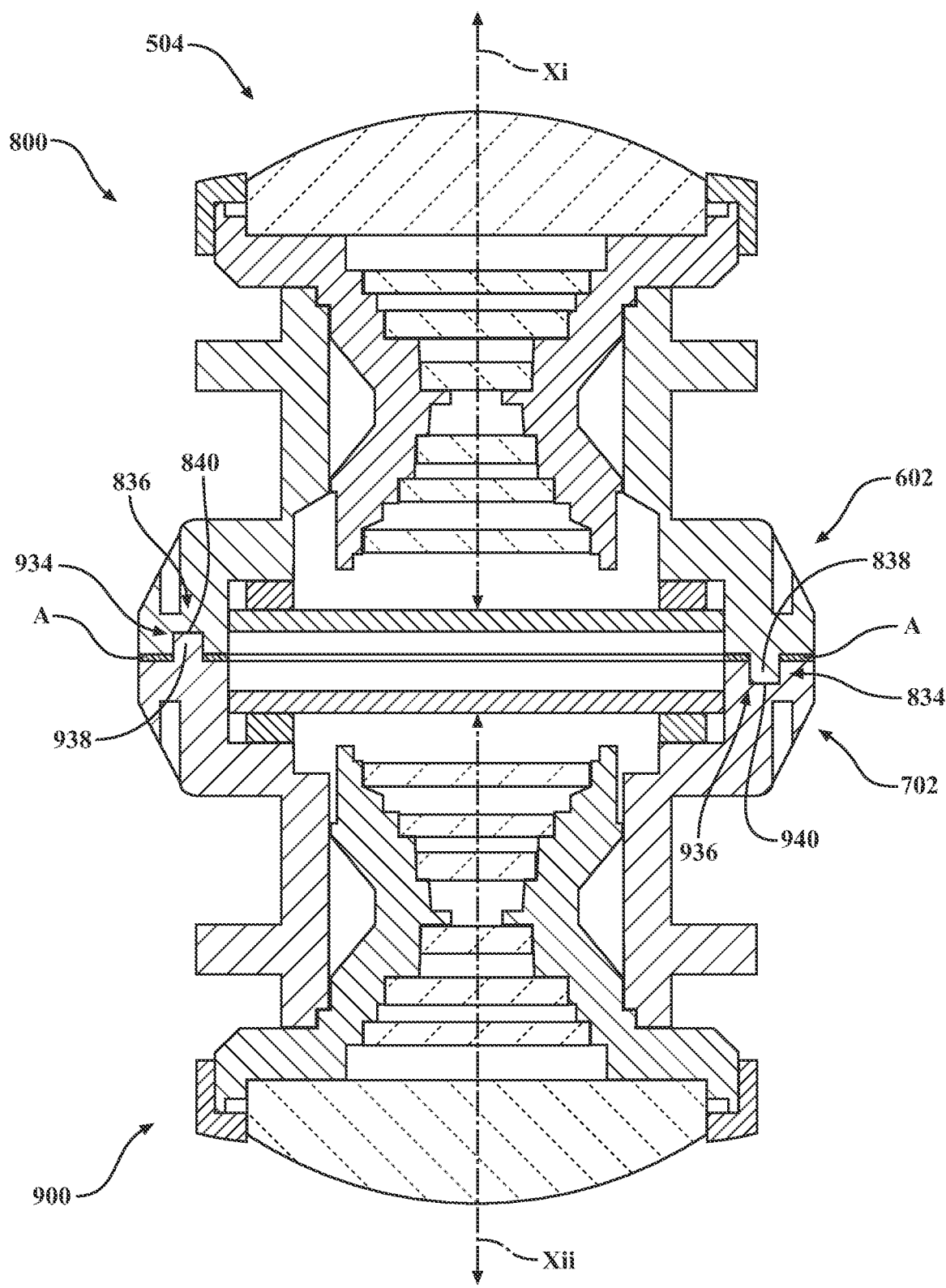
FIG. 8 is a transverse (e.g., horizontal) cross-sectional view of another example of the optical module seen in FIG. 5.
Figure 9:
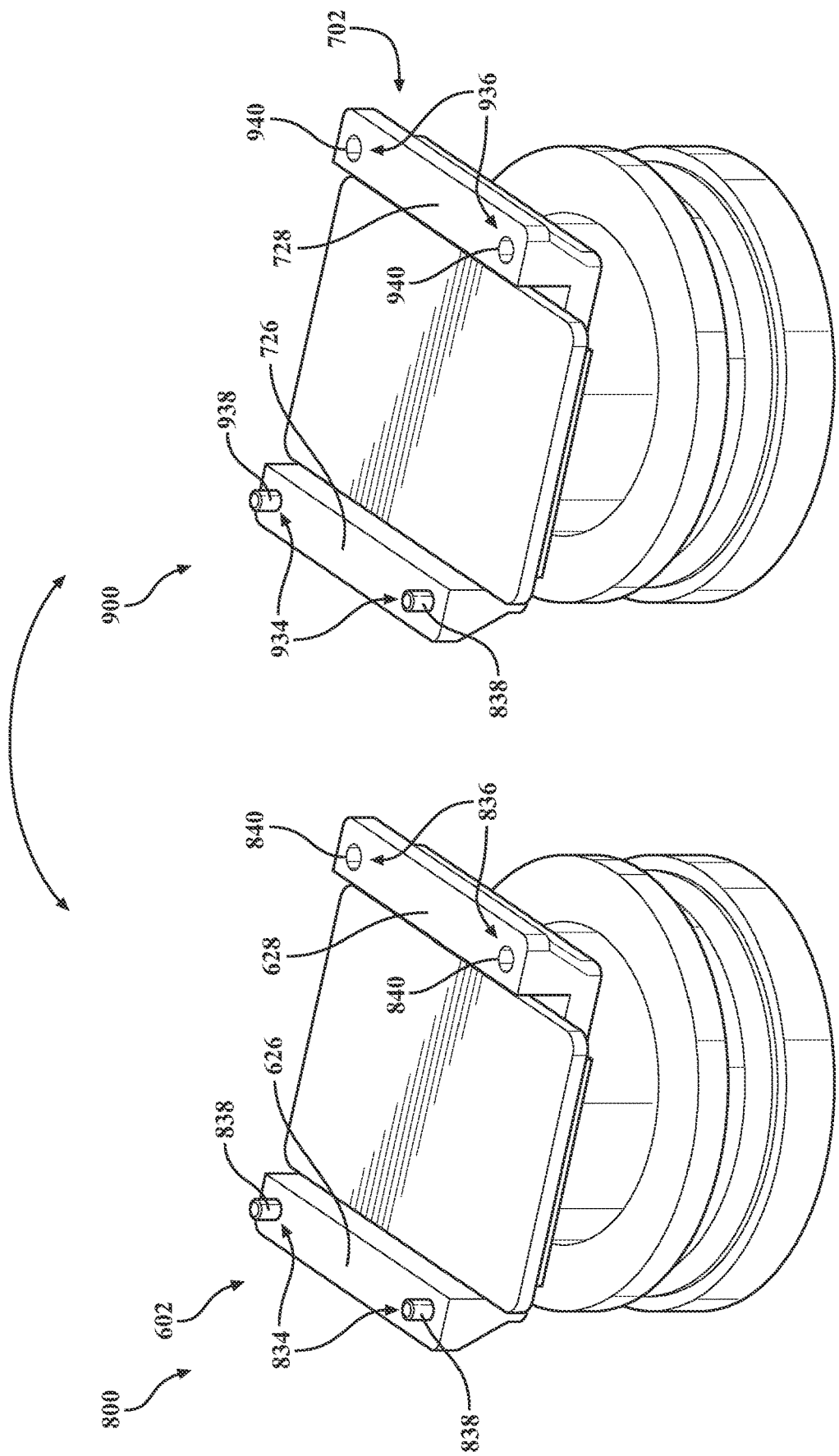
FIG. 9 is an inner (bottom) perspective view of the optical module seen in FIG. 8 with the first and second ISLAs shown separated.

With reference now to FIGS. 8 and 9, another embodiment of the presently disclosed optical module will be discussed, which is identified by the reference character 504 and includes respective first and second ISLAs 800, 900. More specifically, FIG. 8 is a transverse (e.g., horizontal) cross-sectional view of the optical module 504, and FIG. 9 is an inner (bottom) perspective view of the optical module 504 with the ISLAs 800, 900 shown separated. The optical module 504 and the ISLAs 800, 900 include features similar to the aforedescribed optical module 502 (FIGS. 5-7) and the ISLAs 600, 700 and, accordingly, will only be discussed with respect to differences therefrom in the interest of brevity. As such, identical reference characters will be utilized to refer to elements, structures, features, etc., common to the optical modules 502, 504 and the ISLAs 600, 700 and the ISLAs 800, 900, respectively.

Whereas the ISLAs 600, 700 (FIGS. 5-7) are devoid of any mechanical engagement therebetween, the ISLAs 800, 900 include corresponding locating members 834, 836 and 934, 936, respectively. More specifically, as seen in FIG. 9, the locating members 834, 836 are associated with the mounting surfaces 626, 628 on the lens holder 602 of the ISLA 800 and the locating members 934, 936 are associated with the mounting surfaces 726, 728 on the lens holder 702 of the ISLA 900. The locating members 834, 836, 934, 936 are configured to establish a mechanical interface between the ISLAs 800, 900 that facilitates (supports) proper registration (alignment) of the ISLAs 800, 900 during assembly of the optical module 504.

In the illustrated embodiment, the locating members 834, 934 are configured as projections 838, 938 (e.g., pins, detents, posts, etc.) and the locating members 836, 936 are configured as recesses 840, 940 (e.g., openings, indentations, holes, etc.) such that, upon assembly of the optical module 504, the projection(s) 838 included on the ISLA 800 interface with (e.g., are inserted into) the recess(es) 940 included on the ISLA 900 and such that the projection(s) 938 included on the ISLA 900 interface with (e.g., are inserted into) the recess(es) 840 included on the ISLA 800. More specifically, ISLAs 800, 900 are configured such that the projection(s) 838, 938 extend from the mounting surfaces 626, 726 and such that the recess(es) 840, 940 extend into the mounting surfaces 628, 728.

While the ISLAs 800, 900 are each shown as including a pair of projections 838, 938 and a pair of recesses 840, 940, respectively, embodiments are envisioned in which the particular number of projections 838, 938 and recesses 840, 940 may be varied. For example, embodiments of the ISLAs 800, 900 each including a single projection 838, 938 and a single recess 840, 940 are also envisioned herein, as are embodiment including three or more projections 838, 938 and recesses 840, 940, respectively.

Additionally, while the ISLAs 800, 900 are configured such that the projections 838, 938 are exclusively provided on the mounting surfaces 626, 726 and such that the recesses 840, 940 are exclusively provided on the mounting surfaces 628, 728, respectively, embodiments in which the projections 838, 938 and the recesses 840, 940 may be provided on each of the mounting surfaces 626, 726 and the mounting surfaces 628, 728, respectively, are also envisioned herein. For example, in one embodiment, it is envisioned that the mounting surfaces 626, 726 may each include a single projection 838, 938 and that the mounting surfaces 726, 728 may each include a single recess 840, 940, respectively, whereas in another embodiment, it is envisioned that the mounting surfaces 626, 726 may include a pair of projections 838, 938 and a single recess 840, 940 and that the mounting surfaces 628, 728 may include a pair of recesses 840, 940 and a single projection 838, 938, respectively.

During assembly of the optical module 504, the adhesive A is applied to the lens holders 602, 702 (e.g., the mounting surfaces 626, 628 and the mounting surfaces 726, 728, respectively), and the ISLAs 800, 900 are advanced towards each other such that locating members 834, 836 and the locating members 934, 936 are engaged via insertion of the projection(s) 838, 938 into the recess(es) 840, 940, respectively, thereby mechanically aligning the ISLAs 800, 900 such that the optical axes Xi, Xii are coincident with each other.

Following alignment of the ISLAs 800, 900, the optical module 504 is subjected to the aforedescribed curing procedure, thereby fixing the connection between the ISLAs 800, 900 along the adhesive joints J, which extend in (generally) orthogonal relation to the optical axes Xi, Xii, after which, the ISLAs 800, 900 are allowed to cool and are cleaned in the manner described above.

Figure 11:
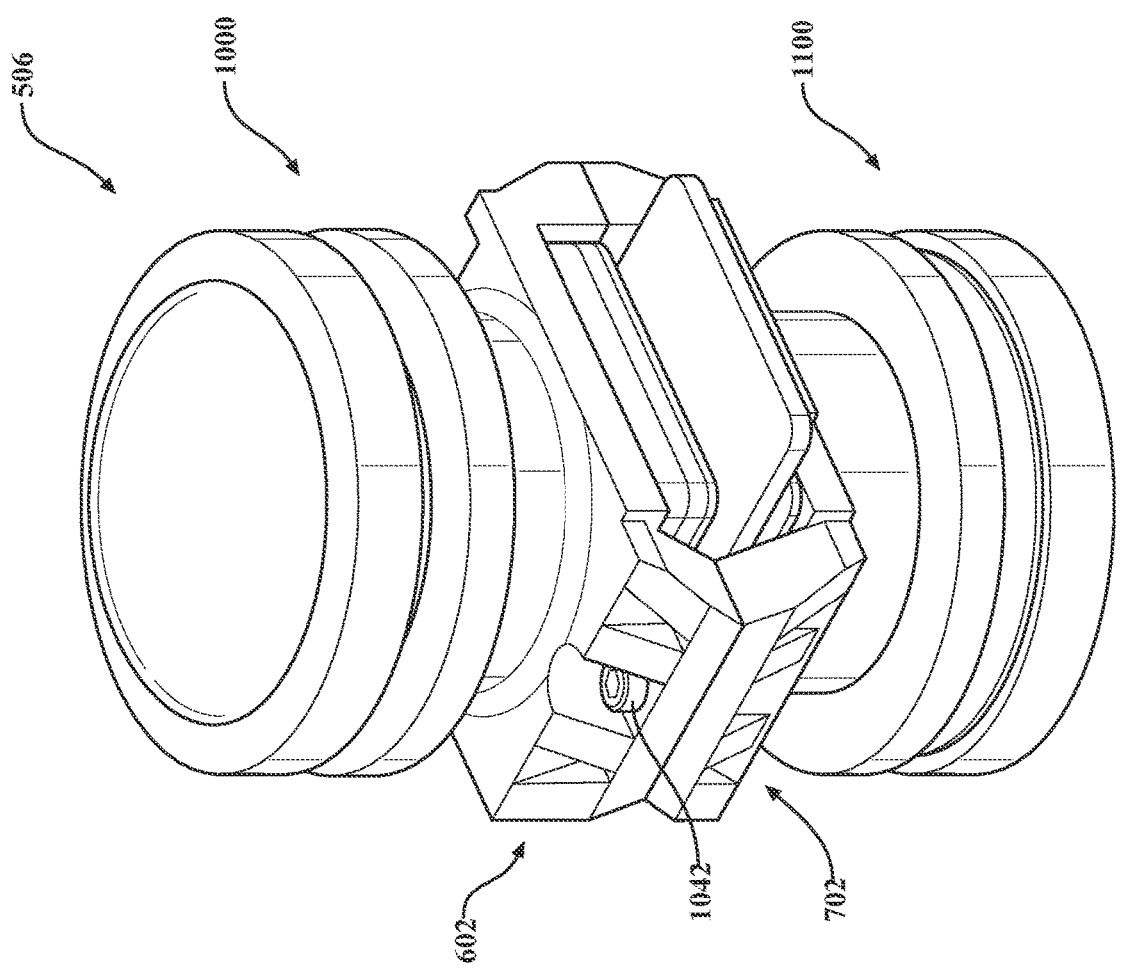
FIG. 11 is a top, perspective view of the optical module seen in FIG. 10 upon assembly.
Figure 10:
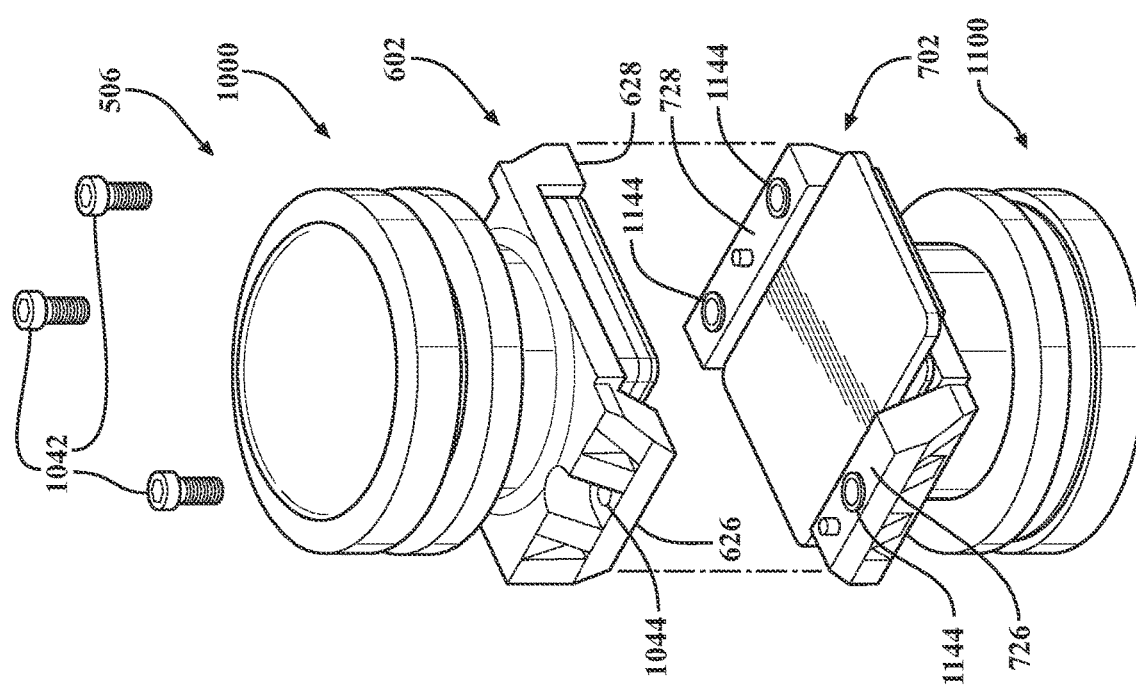
FIG. 10 is a top, perspective view of another example of the optical module seen in FIG. 5 with the first and second ISLAs shown separated.

FIGS. 10 and 11 illustrate a variation on the optical module 504, which is identified by the reference character 506 and includes respective first and second ISLAs 1000, 1100. More specifically, FIG. 10 is a top, perspective view of the optical module 506 with the ISLAs 1000, 1100 shown separated, and FIG. 11 is a top, perspective view of the optical module 506 upon assembly. The optical module 506 and the ISLAs 1000, 1100 include features similar to the aforedescribed optical module 504 (FIGS. 8 and 9) and the ISLAs 800, 900 and, accordingly, will only be discussed with respect to differences therefrom in the interest of brevity. As such, identical reference characters will be utilized to refer to elements, structures, features, etc., common to the optical modules 504, 506 and the ISLAs 800, 900 and the ISLAs 1000, 1100, respectively.

In addition to the mechanical engagement between the ISLAs 1000, 1100 established by the locating members 834, 836 (FIGS. 8, 9) and the locating members 934, 936, respectively, the ISLAs 1000, 1100 are mechanically connected by one or more fasteners 1042 (e.g., one or more screws, pins, rivets, clips, etc.). The fastener(s) 1042 extend into corresponding openings 1044, 1144 that are defined by the respective lens holders 602, 702 such that, upon assembly of the optical module 506, the ISLAs 1000, 1100 are both mechanically and adhesively connected together.

In the illustrated embodiment, the ISLAs 1000, 1100 are each shown as including three openings 1044, 1144, which are associated with the mounting surfaces 626, 628 and the mounting surfaces 726, 728, respectively. It should be appreciated, however, that the particular number of openings 1044, 1144, and, thus, the particular number of fasteners 1042, may be varied in alternate embodiments without departing from the scope of the present disclosure. For example, embodiments of the ISLAs 1000, 1100 including a pair of respective openings 1044, 1144 that are configured to receive a corresponding pair of fasteners 1042 (e.g., such that the mounting surfaces 626, 628 and the mounting surfaces 726, 728 each respectively include a single opening 1044, 1144) are also envisioned herein.

During assembly of the optical module 506, following the application of the adhesive A (FIG. 8) to the lens holders 602, 702 and engagement of the locating members 834, 836 and the locating members 934, 936, the fasteners 1042 are inserted into the openings 1044, 1144, thereby mechanically connecting the ISLAs 1000, 1100, respectively. Mechanically connecting the ISLAs 1000, 1100 not only enhances the stability of the optical module 506 by further inhibiting (if not entirely preventing) relative movement between the ISLAs 1000, 1100, but supports curing of the adhesive A.

Curing, cooling, and cleaning of the optical module 506 can then proceed in the manner discussed above.

Figure 12:
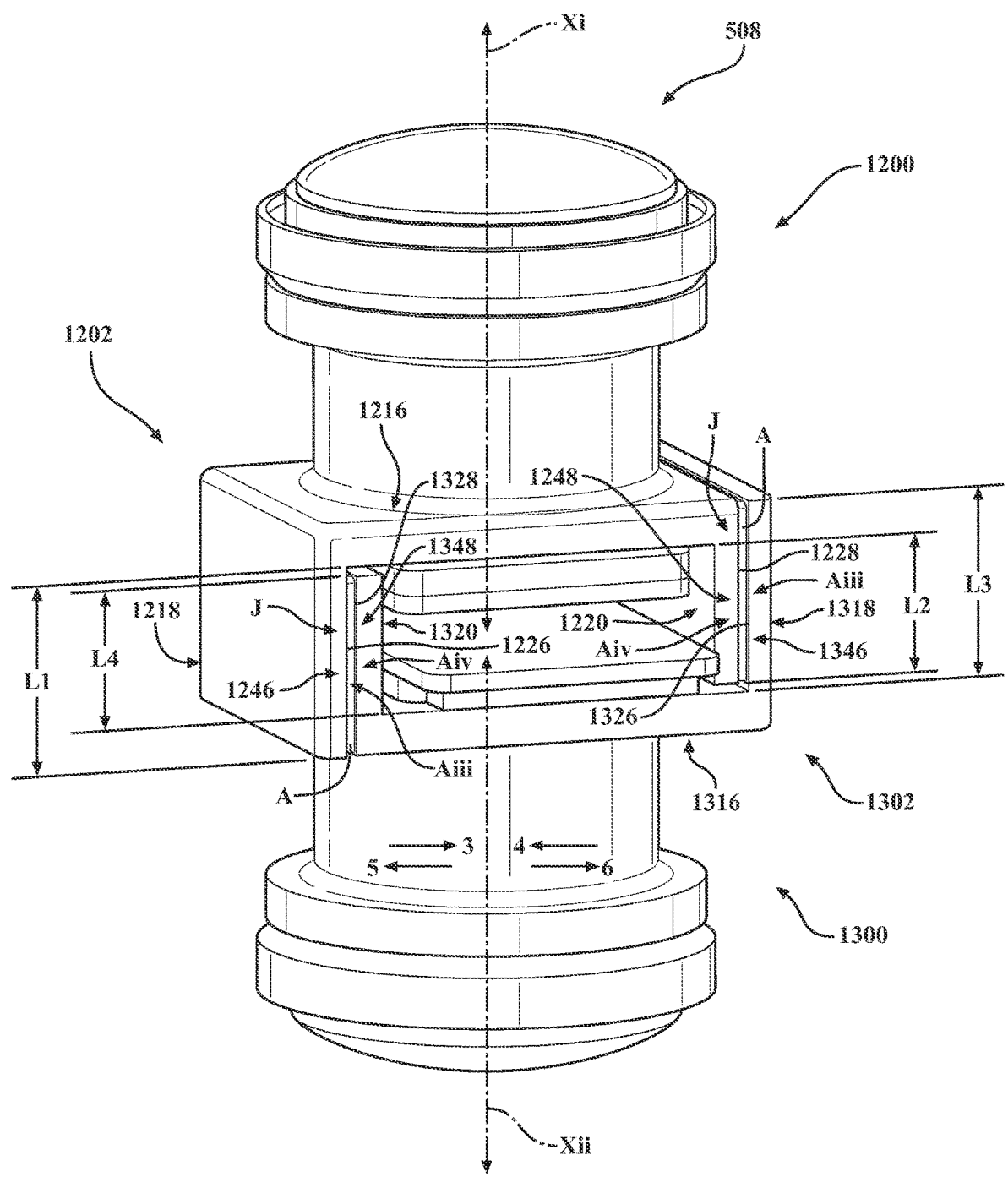
FIG. 12 is a top, perspective view of another example of the optical module seen in FIG. 5.

With reference now to FIG. 12, another embodiment of the presently disclosed optical module will be discussed, which is identified by the reference character 508 and includes respective first and second ISLAs 1200, 1300. More specifically, FIG. 12 is a top, perspective view of the optical module 508 upon assembly. The optical module 508 and the ISLAs 1200, 1300 include features similar to the aforedescribed optical module 502 (FIGS. 5-7) and the ISLAs 600, 700 and, accordingly, will only be discussed with respect to differences therefrom in the interest of brevity. As such, identical reference characters will be utilized to refer to elements, structures, features, etc., common to the optical modules 502, 508 and the ISLAs 600, 700 and the ISLAs 1200, 1300.

In contrast to the ISLAs 600, 700 (FIGS. 5-7), in which the lens holders 602, 702 are symmetrical about the respective optical axes Xi, Xii, the ISLAs 1200, 1300 respectively include lens holders 1202, 1302 that are asymmetrical about the optical axes Xi, Xii. More specifically, the lens holder 1202 includes a backspan 1216 and a pair of non-identical legs 1218, 1220, and the lens holder 1302 includes a backspan 1316 and a pair of non-identical legs 1318, 1320.

The legs 1218, 1220 respectively define lengths L1, L2, wherein the length L1 exceeds the length L2, and include lateral sidewalls 1246, 1248 defining mounting surfaces 1226, 1228, which extend in (generally) parallel relation to the optical axis Xi. Similarly, the legs 1318, 1320 respectively define lengths L3, L4, wherein the length L3 exceeds the length L4, and include lateral sidewalls 1346, 1348 defining mounting surfaces 1326, 1328, which extend in (generally) parallel relation to the optical axis Xi and in (generally) parallel relation to the mounting surfaces 1226, 1228. More specifically, the lens holders 1202, 1302 are configured such that the mounting surfaces 1226, 1326 face (laterally, radially) inward (e.g., toward the optical axes Xi, Xii and the mounting surfaces 1328, 1228, respectively) and such that the mounting surfaces 1228, 1328 face (laterally, radially) outward (e.g., away from the optical axes Xi, Xii and towards the mounting surfaces 1326, 1226).

In contrast to the optical module 502 (FIGS. 5-7), in which the ISLAs 600, 700 are configured such that the mounting surfaces 626, 628 and the mounting surfaces 726, 728 defined thereby are oriented in the rearward and forward directions 1, 2, respectively, the ISLAs 1200, 1300 are configured such that the mounting surfaces 1226, 1326 face (laterally, radially) inward in directions 3, 4 and such that the mounting surfaces 1228, 1328 face (laterally, radially) outward in directions 5, 6, wherein the directions 3, 4, 5, 6 are (generally) orthogonal in relation to the rearward and forward directions 1, 2, which allows the mounting surfaces 1226, 1326 and the mounting surfaces 1228, 1328 to define increased surface areas Aiii, Aiv, respectively, when compared to the surface areas Ai, Aii (FIG. 7). For example, in the illustrated embodiment, the lens holders 1202, 1302 are configured such that the surface areas Aiii, Aiv lie (substantially) within the range of (approximately) 75 mm$^2$ to (approximately) 125 mm$^2$. As discussed above in connection with the optical module 502 (FIGS. 5-7), however, it is envisioned that the lens holders 1202, 1302 may be configured such that the surface areas Aiii, Aiv lie outside the disclosed range.

During assembly of the optical module 508, the adhesive A is applied to the mounting surfaces 1226, 1228, 1326, 1328, and the ISLAs 1200, 1300 are actively aligned such that optical axes Xi, Xii are coincident with each other (e.g., utilizing shims and/or the aforementioned camera-based vision system). The lens holders 1202, 1302 are then positioned such that the lateral sidewalls 1246, 1248 (e.g., the mounting surfaces 1226, 1228) are positioned adjacent to (e.g., are in direct contact (engagement) with) the lateral sidewalls 1348, 1346 (e.g., the mounting surfaces 1328, 1326), respectively, and the optical module 508 is subjected to the aforedescribed curing procedure. As the adhesive A cures, the adhesive joints J are formed, which extend in (generally) parallel relation to the optical axes Xi, Xii and fix the ISLAs 1200, 1300 in relation to each other. The ISLAs 1200, 1300 are then allowed to cool and are cleaned in the manner described above.

Figures 13, 14:
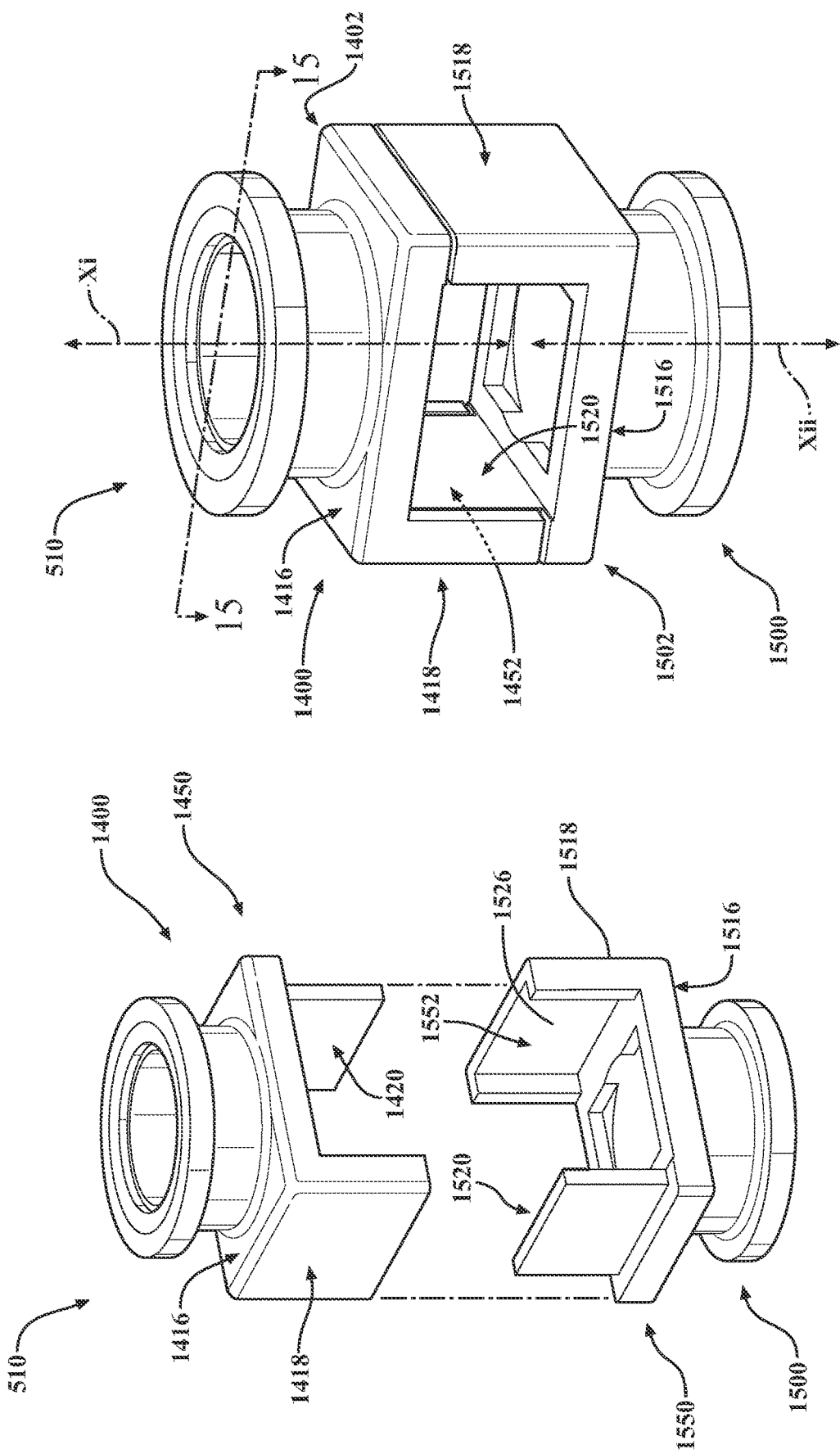
FIG. 13 is a partial, top, perspective view of another example of the optical module seen in FIG. 5 with the first and second ISLAs shown separated.
FIG. 14 is a partial, top, perspective view of the optical module seen in FIG. 13 upon assembly.
Figure 15:
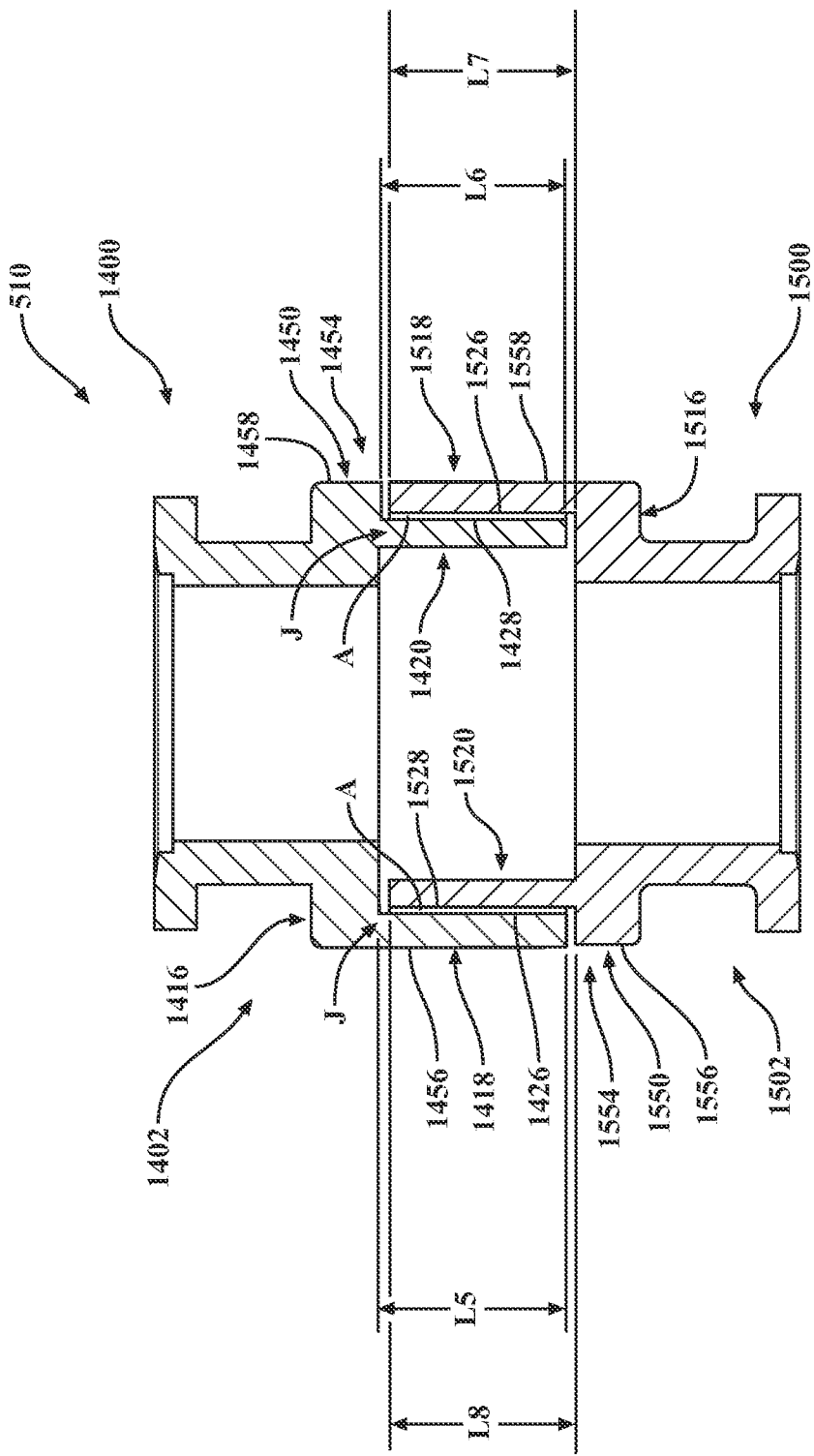
FIG. 15 is a transverse (e.g., horizontal) cross-sectional view taken along line 15-15 in FIG. 14.

With reference now to FIGS. 13-15, another embodiment of the presently disclosed optical module will be discussed, which is identified by the reference character 510 and includes respective first and second ISLAs 1400, 1500. More specifically, FIG. 13 is a partial, top, perspective view of the optical module 510 with the ISLAs 1400, 1500 shown separated; FIG. 14 is a partial, top, perspective view of the optical module 510 upon assembly; and FIG. 15 is a transverse (e.g., horizontal) cross-sectional view taken along line 15-15 in FIG. 14. The optical module 510 and the ISLAs 1400, 1500 include features similar to the aforedescribed optical module 508 (FIG. 12) and the ISLAs 1200, 1300 and, accordingly, will only be discussed with respect to differences therefrom in the interest of brevity. As such, identical reference characters will be utilized to refer to elements, structures, features, etc., common to the optical modules 508, 510 and the ISLAs 1200, 1300 and the ISLAs 1400, 1500.

As discussed in connection with the optical module 508 (FIG. 12), the optical module 510 includes lens holders 1402, 1502 that are asymmetrical about the optical axes Xi, Xii. More specifically, the lens holder 1402 includes: a backspan 1416; a pair of non-identical legs 1418, 1420; and an overhang 1450, and the lens holder 1502 includes: a backspan 1516; a pair of non-identical legs 1518, 1520; and an overhang 1550.

The leg 1418 is non-uniform in configuration and extends from the backspan 1416 so as to define a length L5. The leg 1418 includes a pocket 1452 that is configured to receive the leg 1520 on the lens holder 1502 upon assembly of the optical module 510. More specifically, the pocket 1452 (FIG. 14) extends (laterally, radially) outward so as to define a mounting surface 1426 that faces (laterally, radially) inward (e.g., toward the optical axis Xi and the leg 1420).

The leg 1420 is uniform in configuration and extends from the backspan 1416 so as to define a length L6 that is (generally) equivalent to the length L5 and a mounting surface 1428 that that faces (laterally, radially) outward (e.g., away from the optical axis Xi and the leg 1418). In contrast to the leg 1418, however, the leg 1420 is inset from a periphery 1454 of the backspan 1416 so as to define the overhang 1450, which extends (laterally, radially) outward in relation to the leg 1420.

The leg 1518 is non-uniform in configuration and extends from the backspan 1516 so as to define a length L7. The leg 1518 includes a pocket 1552 (FIG. 13) that is configured to receive the leg 1420 on the lens holder 1402 upon assembly of the optical module 510. More specifically, the pocket 1552 extends (laterally, radially) outward so as to define a mounting surface 1526 that faces (laterally, radially) inward (e.g., toward the optical axis Xi and the leg 1520).

The leg 1520 is uniform in configuration and extends from the backspan 1516 so as to define a length L8 that is (generally) equivalent to the length L7 and a mounting surface 1528 that that faces (laterally, radially) outward (e.g., away from the optical axis Xi and the leg 1518). In contrast to the leg 1518, however, the leg 1520 is inset from a periphery 1554 of the backspan 1516 so as to define the overhang 1550, which extends (laterally, radially) outward in relation to the leg 1520.

During assembly of the optical module 510, the adhesive A is applied to the lens holders 1402, 1502 (e.g., the mounting surfaces 1426, 1428 and the mounting surfaces 1526, 1528, respectively) and the ISLAs 1400, 1500 are advanced towards each other such that the legs 1420, 1520 are inserted into the pockets 1552, 1452 respectively defined by the legs 1518, 1418, thereby mechanically aligning the ISLAs 1400, 1500 such that the optical axes Xi, Xii are coincident with each other. As seen in FIG. 15, upon assembly of the optical module 510, the legs 1418, 1518 are positioned adjacent to (e.g., in engagement (contact) with) the respective overhangs 1550, 1450, whereby outer surfaces 1456, 1458 of the leg 1418 and the overhang 1450 are (generally) flush (coextensive) with outer surfaces 1556, 1558 of the overhang 1550 and the leg 1518, respectively. It is envisioned that positioning of the legs 1418, 1518 in adjacent relation to the respective overhangs 1550, 1450 may further stabilize the optical module 510 by further inhibiting (if not entirely preventing) relative movement between the ISLAs 1400, 1500.

The optical module 510 is then subjected to the aforedescribed curing procedure to thereby define the adhesive joints J, which extend in (generally) parallel relation to the optical axes Xi, Xii and fix the ISLAs 1400, 1500 in relation to each other. The ISLAs 1400, 1500 are then allowed to cool and are cleaned in the manner described above.

Figure 16:
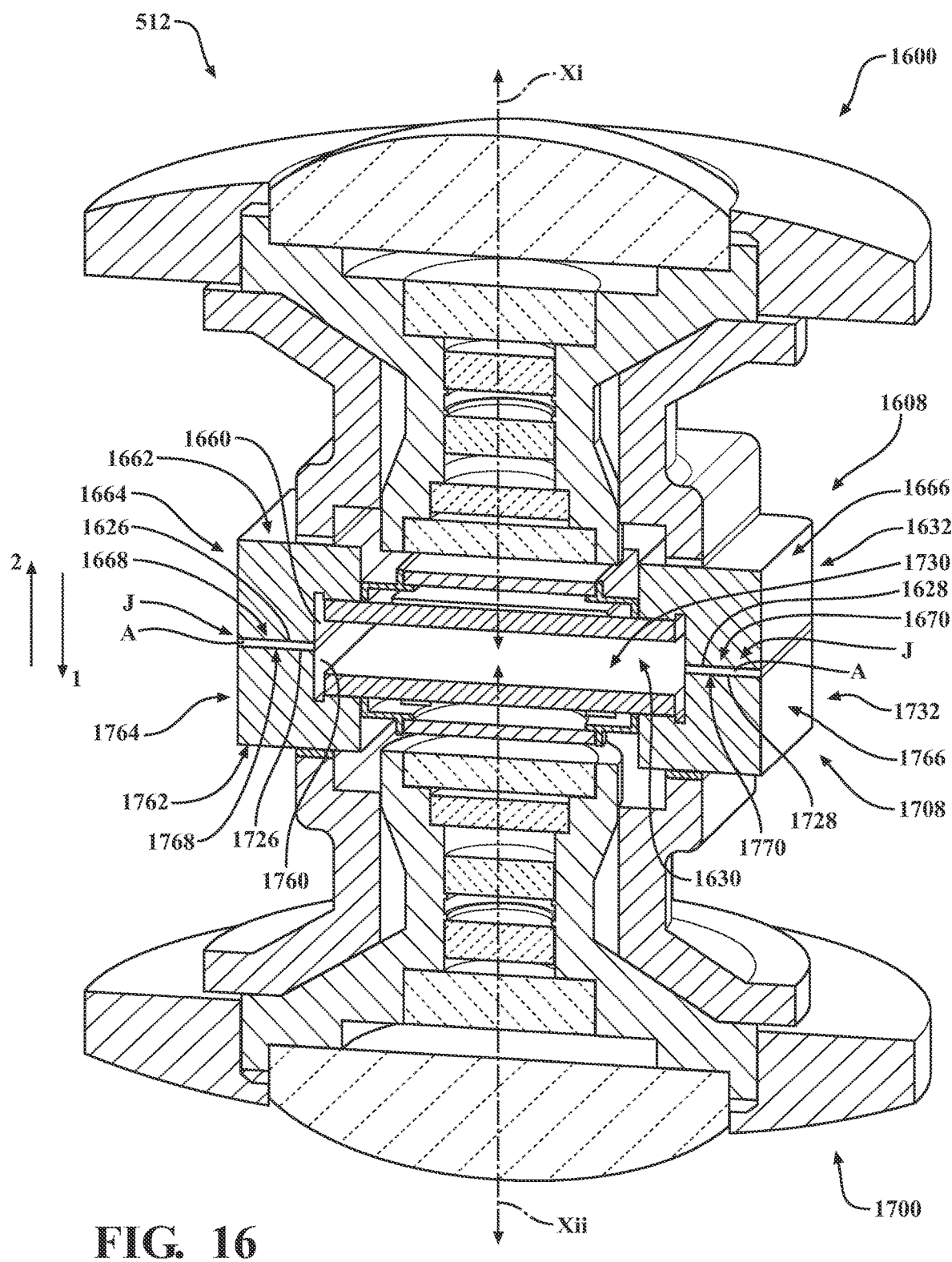
FIG. 16 is a transverse (e.g., horizontal), perspective, cross-sectional view of another example of the optical module seen in FIG. 5.

With reference now to FIG. 16, another embodiment of the presently disclosed optical module will be discussed, which is identified by the reference character 512 and includes respective first and second ISLAs 1600, 1700. More specifically, FIG. 16 is a transverse (e.g., horizontal), perspective, cross-sectional view of the optical module 512. The optical module 512 and the ISLAs 1600, 1700 include features similar to the aforedescribed optical module 502 (FIGS. 5-7) and the ISLAs 600, 700 and, accordingly, will only be discussed with respect to differences therefrom in the interest of brevity. As such, identical reference characters will be utilized to refer to elements, structures, features, etc., common to the optical modules 502, 512 and the ISLAs 600, 700 and the ISLAs 1600, 1700.

In contrast to the optical module 502, in which the ISLAs 600, 700 are connected via the lens holders 602, 702 (and the adhesive A), the ISLAs 1600, 1700 include PCB subassemblies 1608, 1708 with cover glass holders 1632, 1732 that are adhesively connected during assembly of the optical module 512.

As seen in FIG. 16, the cover glass holder 1632 is symmetrical about the optical axis Xi and includes a (generally) U-shaped cross-sectional configuration that defines a chamber 1660, which is configured to receive the PCB 1630 and the image sensor(s) 342 (FIG. 3). The cover glass holder 1632 includes a backspan 1662, which extends in (generally) orthogonal relation to the optical axis Xi, and a pair of (generally) identical legs 1664, 1666, which extend from the backspan 1662 in (generally) orthogonal relation thereto. The legs 1664, 1666 include innermost end walls 1668, 1670 defining mounting surfaces 1626, 1628, respectively, that are (generally) planar (e.g., flat) and (generally) uniform in configuration. More specifically, the mounting surfaces 1626, 1628 extend in (generally) orthogonal relation to the optical axis Xi and are oriented in the rearward direction 1.

Similarly, the cover glass holder 1732 is symmetrical about the optical axis Xii and includes a (generally) U-shaped cross-sectional configuration that defines a chamber 1760, which is configured to receive the PCB 1730 and the image sensor(s) 346 (FIG. 3). The cover glass holder 1732 includes a backspan 1762, which extends in (generally) orthogonal relation to the optical axis Xii, and a pair of (generally) identical legs 1764, 1766, which extend from the backspan 1762 in (generally) orthogonal relation thereto. The legs 1764, 1766 include innermost end walls 1768, 1770 defining mounting surfaces 1726, 1728, respectively, that are (generally) planar (e.g., flat) and (generally) uniform in configuration. More specifically, the mounting surfaces 1726, 1728 extend in (generally) orthogonal relation to the optical axis Xii and are oriented in the forward direction 2.

During assembly of the optical module 512, the adhesive A is applied to the mounting surfaces 1626, 1628, 1726, 1728, and the ISLAs 1600, 1700 are actively aligned such that optical axes Xi, Xii are coincident with each other (e.g., utilizing shims and/or the aforementioned camera-based vision system). The cover glass holders 1632, 1732 are then positioned such that the innermost end walls 1668, 1670 (e.g., the mounting surfaces 1626, 1628) are positioned adjacent to (e.g., are in direct contact (engagement) with) the innermost end walls 1768, 1770 (e.g., the mounting surfaces 1726, 1728), respectively, and the optical module 512 is subjected to the aforedescribed curing procedure, thereby define the adhesive joints J, which extend in (generally) orthogonal relation to the optical axes Xi, Xii and fix the ISLAs 1600, 1700 in relation to each other. The ISLAs 1600, 1700 are then allowed to cool and are cleaned in the manner described above.

Figure 17:
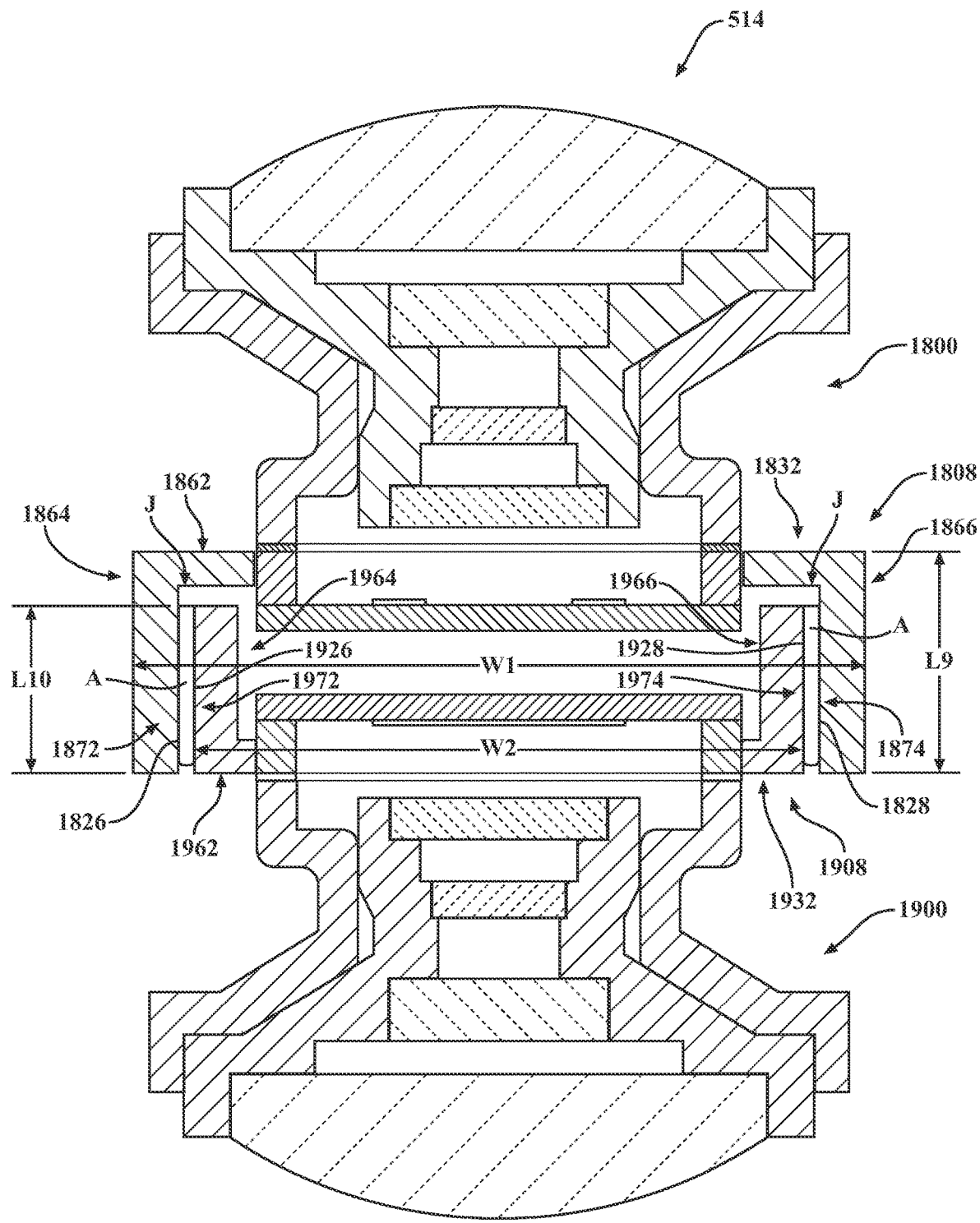
FIG. 17 is a transverse (e.g., horizontal) cross-sectional view of another example of the optical module seen in FIG. 5.
Figure 18:
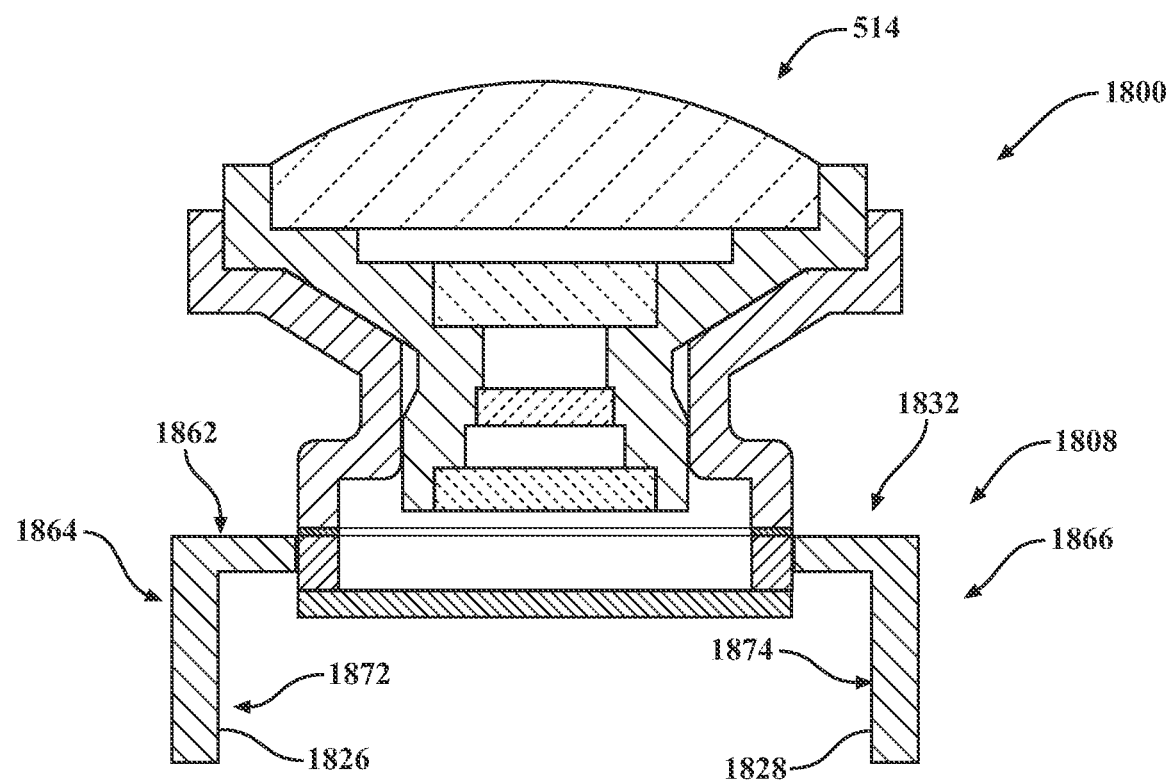
FIG. 18 is a partial, transverse (e.g., horizontal) cross-sectional view of the optical module seen in FIG. 17 with the first and second ISLAs shown separated.
Figure 18:
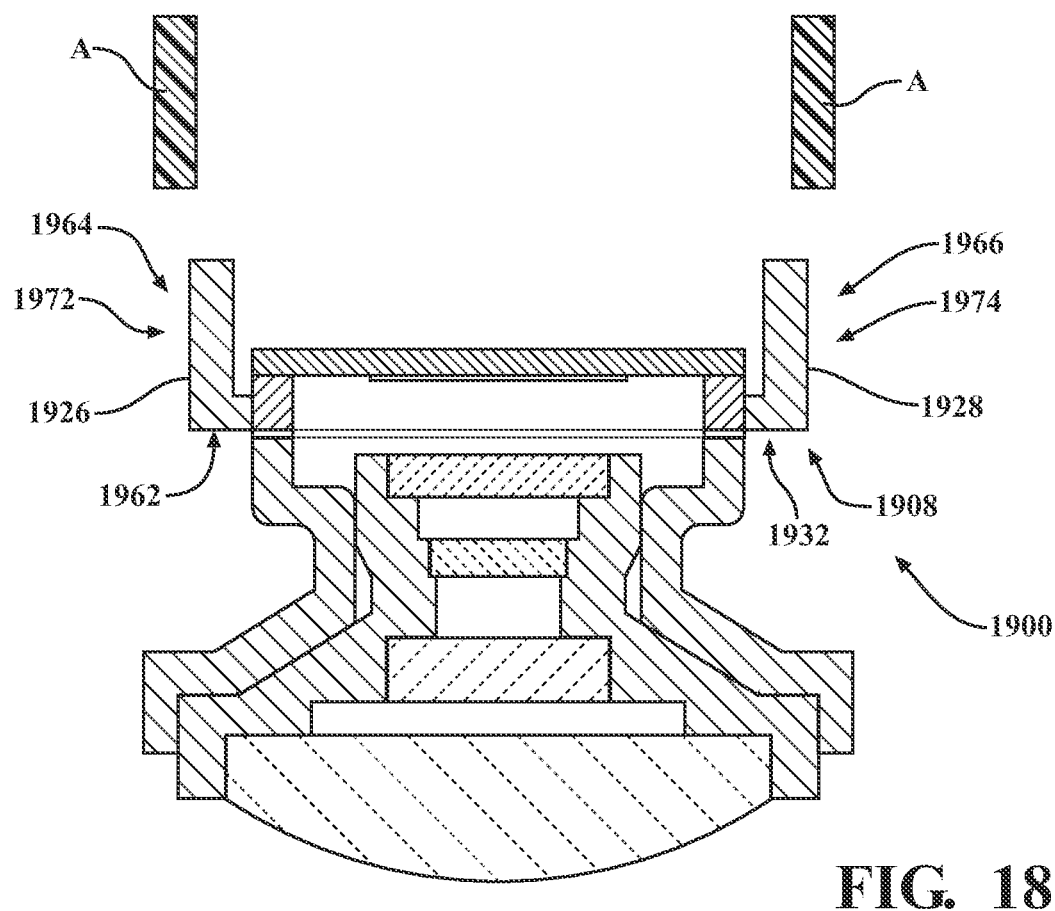

With reference now to FIGS. 17 and 18, another embodiment of the presently disclosed optical module will be discussed, which is identified by the reference character 514 and includes respective first and second ISLAs 1800, 1900. More specifically, FIG. 17 is a transverse (e.g., horizontal) cross-sectional view of the optical module 514 upon assembly, and FIG. 18 is a partial, transverse (e.g., horizontal) cross-sectional view of the optical module 514 with the ISLAs 1800, 1900 shown separated. The optical module 514 and the ISLAs 1800, 1900 include features similar to the aforedescribed optical module 512 (FIG. 16) and the ISLAs 1600, 1700 and, accordingly, will only be discussed with respect to differences therefrom in the interest of brevity. As such, identical reference characters will be utilized to refer to elements, structures, features, etc., common to the optical modules 512, 514 and the ISLAs 1600, 1700 and the ISLAs 1800, 1900.

In contrast to the ISLAs 1600, 1700 (FIG. 16), which are (generally) identical in configuration, the ISLAs 1800, 1900 are non-identical in configuration. More specifically, the ISLA 1800 includes a PCB subassembly 1808 with a cover glass holder 1832 having a backspan 1862 defining a width W1 and a pair of legs 1864, 1866 that each define a length L9 and extend from the backspan 1862 in (generally) orthogonal relation thereto, and the ISLA 1900 includes a PCB subassembly 1908 with a cover glass holder 1932 having a backspan 1962 defining a width W2 and a pair of legs 1964, 1966 that each define a length L10 and extend from the backspan 1962 in (generally) orthogonal relation thereto.

The legs 1864, 1866 include lateral sidewalls 1872, 1874 defining (inner) mounting surfaces 1826, 1828, which extend in (generally) parallel relation to the optical axis Xi and face (laterally, radially) inward (e.g., towards the optical axis Xi and each other). The legs 1964, 1966, by contrast, include lateral sidewalls 1972, 1974 defining (outer) mounting surfaces 1926, 1928, which extend in (generally) parallel relation to the optical axis Xii and face (laterally, radially) outward (e.g., away from the optical axis Xii and each other).

As seen in FIG. 17, the width W1 exceeds the width W2 and the lengths L9 exceed the lengths L10. As a result, the ISLAs 1800, 1900 are configured such that, upon assembly of the optical module 514, the ISLA 1900 is received by the ISLA 1800. More specifically, the PCB subassembly 1908 (e.g., the cover glass holder 1932) nests within the PCB subassembly 1808 (e.g., the cover glass holder 1832).

During assembly of the optical module 514, the adhesive A is applied to the mounting surfaces 1826, 1828, 1926, 1928, and the ISLAs 1800, 1900 are actively aligned such that optical axes Xi, Xii are coincident with each other (e.g., utilizing shims and/or the aforementioned camera-based vision system). The cover glass holders 1930, 1932 are then positioned such that the mounting surfaces 1826, 1828 are positioned adjacent to (e.g., are in direct contact (engagement) with) the mounting surfaces 1926, 1928, and the optical module 514 is subjected to the aforedescribed curing procedure to thereby define the adhesive joints J, which extend in (generally) parallel relation to the optical axes Xi, Xii and fix the ISLAs 1800, 1900 in relation to each other. The ISLAs 1800, 1900 are then allowed to cool and are cleaned in the manner described above.

Figure 19:
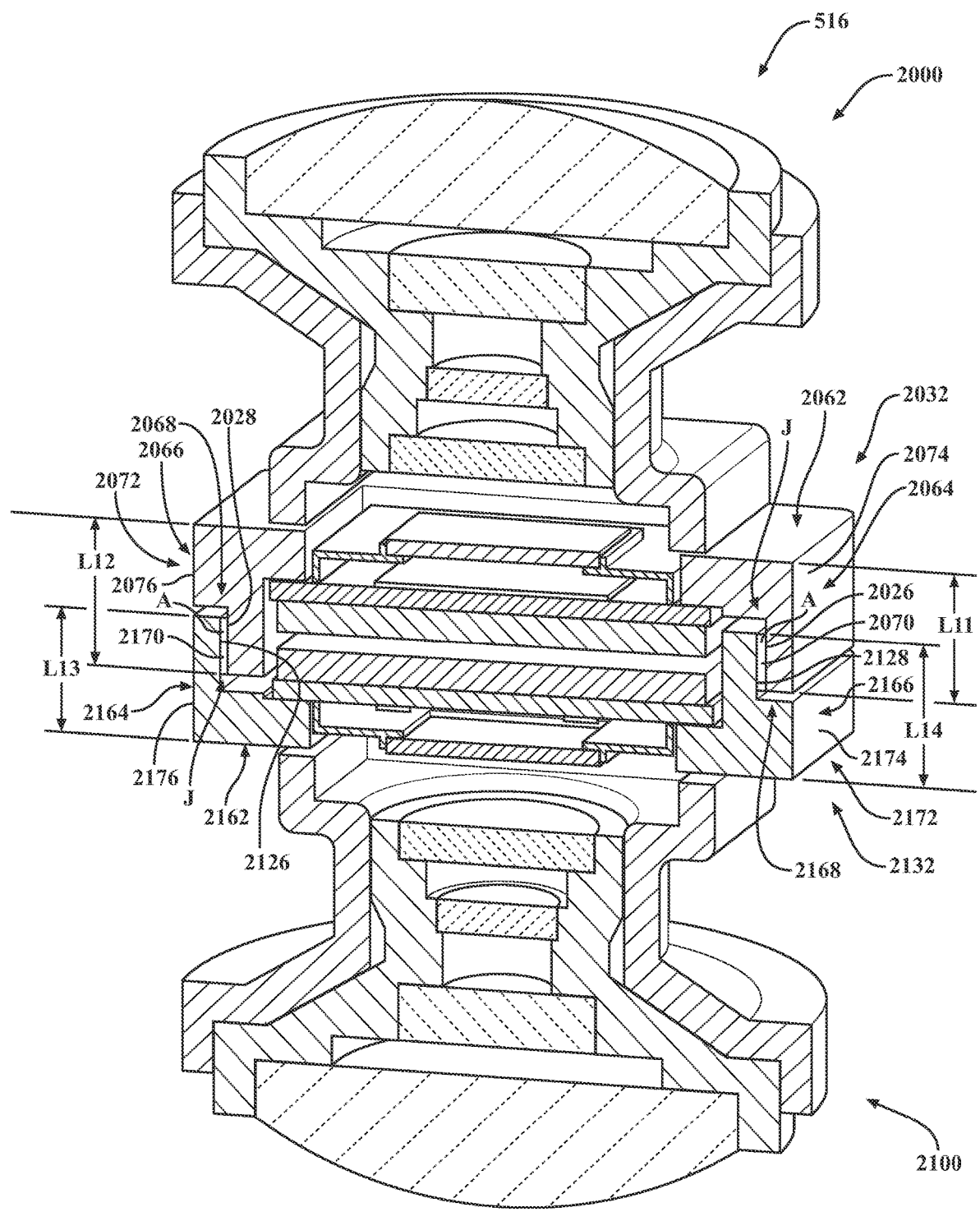
FIG. 19 is a transverse (e.g., horizontal), perspective, cross-sectional view of another example of the optical module seen in FIG. 5.

With reference now to FIG. 19, another embodiment of the presently disclosed optical module will be discussed, which is identified by the reference character 516 and includes respective first and second ISLAs 2000, 2100. More specifically, FIG. 19 is a transverse (e.g., horizontal), perspective, cross-sectional view of the optical module 516 upon assembly. The optical module 516 and the ISLAs 2000, 2100 include features similar to the aforedescribed optical module 514 (FIGS. 17, 18) and the ISLAs 1800, 1900 and, accordingly, will only be discussed with respect to differences therefrom in the interest of brevity. As such, identical reference characters will be utilized to refer to elements, structures, features, etc., common to the optical modules 514, 516 and the ISLAs 1800, 1900 and the ISLAs 2000, 2100.

In contrast to the ISLAs 1800, 1900 (FIGS. 17, 18), in which the cover glass holders 1832, 1932 are non-identical and are symmetrical about the respective optical axes Xi, Xii, the ISLAs 2000, 2100 include respective cover glass holders 2032, 2132 that are (generally) identical in configuration and are asymmetrical about the optical axes Xi, Xii. More specifically, the cover glass holder 2032 includes: a backspan 2062; a pair of non-identical legs 2064, 2066; and an overhang 2068, and the cover glass holder 2132 includes: a backspan 2162; a pair of non-identical legs 2164, 2166; and an overhang 2168.

The leg 2064 is non-uniform in configuration and extends from the backspan 2062 so as to define a length L11. The leg 2064 includes a pocket 2070 that is configured to receive the leg 2166 on the cover glass holder 2132 upon assembly of the optical module 516. More specifically, the pocket 2070 extends (laterally, radially) outward so as to define a mounting surface 2026 that faces (laterally, radially) inward (e.g., toward the optical axis Xi and the leg 2066). The leg 2064 and the pocket 2070 are thus (substantially) similar in both structure and function to the leg 1418 and the pocket 1452 included on the lens holder 1402 of the optical module 510 discussed above in connection with FIGS. 13-15.

The leg 2066 is uniform in configuration and extends from the backspan 2062 so as to define a length L12, which is greater than the length L11, and a mounting surface 2028 that faces (laterally, radially) outward (e.g., away from the optical axis Xi and the leg 2064). In contrast to the leg 2064, however, the leg 2066 is inset from a periphery 2072 of the backspan 2062 so as to define the outer overhang 2068, which extends (laterally, radially) outward in relation to the leg 2066.

The leg 2164 is non-uniform in configuration and extends from the backspan 2162 so as to define a length L13. The leg 2164 includes a pocket 2170 that is configured to receive the leg 2066 on the cover glass holder 2032 upon assembly of the optical module 516. More specifically, the pocket 2170 extends (laterally, radially) outward so as to define a mounting surface 2126 that faces (laterally, radially) inward (e.g., toward the optical axis Xi and the leg 2166). The leg 2164 and the pocket 2170 are thus (substantially) similar in both structure and function to the leg 1518 and the pocket 1552 included on the lens holder 1502 of the optical module 510 discussed above in connection with FIGS. 13-15.

The leg 2166 is uniform in configuration and extends from the backspan 2062 so as to define a length L14, which is greater than the length L13, and a mounting surface 2128 that faces (laterally, radially) outward (e.g., away from the optical axis Xi and the leg 2164). In contrast to the leg 2164, however, the leg 2166 is inset from a periphery 2172 of the backspan 2062 so as to define the outer overhang 2168, which extends (laterally, radially) outward in relation to the leg 2166.

During assembly of the optical module 516, the adhesive A is applied to the mounting surfaces 2026, 2028, 2126, 2128, respectively) and the ISLAs 2000, 2100 are advanced towards each other such that the legs 2066, 2166 are inserted into the respective pockets 2170, 2070, thereby mechanically aligning the ISLAs 2000, 2100 such that the optical axes Xi, Xii are coincident with each other. As seen in FIG. 19, upon assembly of the optical module 516, the legs 2064, 2164 are positioned adjacent to (e.g., in engagement (contact) with) the respective overhangs 2168, 2068, whereby outer surfaces 2074, 2076 of the leg 2064 and the overhang 2068 are (generally) flush (coextensive) with outer surfaces 2174, 2176 of the overhang 2168 and the leg 2164, respectively. It is envisioned that positioning of the legs 2064, 2164 in adjacent relation to the respective overhangs 2168, 2068 may further stabilize the optical module 516 by further inhibiting (if not entirely preventing) relative movement between the ISLAs 2000, 2100.

The optical module 516 is then subjected to the aforedescribed curing procedure to thereby define the adhesive joints J, which extend in (generally) parallel relation to the optical axes Xi, Xii and fix the ISLAs 2000, 2100 in relation to each other. The ISLAs 2000, 2100 are then allowed to cool and are cleaned in the manner described above.

With reference now to FIG. 20, another embodiment of the presently disclosed optical module will be discussed, which is identified by the reference character 518 and includes respective first and second ISLAs 2200, 2300. More specifically, FIG. 20 is a transverse (e.g., horizontal) cross-sectional view of the optical module 518 upon assembly. The optical module 518 and the ISLAs 2200, 2300 include features similar to the aforedescribed optical module 502 (FIGS. 5-7) and the ISLAs 600, 700 and, accordingly, will only be discussed with respect to differences therefrom in the interest of brevity. As such, identical reference characters will be utilized to refer to elements, structures, features, etc., common to the optical modules 502, 518 and the ISLAs 600, 700 and the ISLAs 2200, 2300.

In addition to the ISLAs 2200, 2300, the optical module 518 includes one or more brackets (caps) 2400, which are located externally of, and extend between, the ISLAs 2200, 2300 to thereby secure the ISLAs 2200, 2300 in relation to each other and increase the structural integrity of the optical module 518 (e.g., the strength, the stability, and/or the rigidity thereof). More specifically, the bracket(s) 2400 extend about and span the inner end 604 of the lens holder 602 and the inner end 704 of the lens holder 702.

The bracket(s) 2400 are adhesively secured to the ISLAs 2200, 2300 and include an inner contour 2402 that corresponds to (e.g., mirrors) an outer contour of the optical module 518 defined by the inner ends 604, 704 of the respective lens holders 602, 702.

While the optical module 518 is shown as including a pair of brackets 2400, embodiments are envisioned in which the particular number of brackets 2400 may be varied. For example, an embodiment of the optical module 518 including a single bracket 2400 is also envisioned herein and would not be beyond the scope of the present disclosure.

The bracket(s) 2400 may include (e.g., may be formed from) any material or combination of materials suitable for the intended purpose of securing the ISLAs 2200, 2300 in the manner described herein. For example, in one embodiment, it is envisioned that the bracket(s) 2400 may include (e.g., may be formed partially or entirely from) one or more non-metallic materials (e.g., one or more plastics, polymers, and/or composite materials). In alternate embodiments, however, it is envisioned that the bracket(s) 2400 may include (e.g., may be formed partially or entirely from) one or more metallic materials (e.g., aluminum, steel, etc.). In such embodiments, it is envisioned that the metallic construction of the bracket(s) 2400 may further increase the structural integrity of the optical module 518 (e.g., the strength, the stability, and/or the rigidity thereof) and provide electromagnetic shielding to the remaining components of the image capture system 500 (FIG. 5).

During assembly of the optical module 518, the ISLAs 2200, 2300 are advanced towards each other such that the lens holders 602, 702 are positioned in adjacent (e.g., contacting, engaging) relation. The adhesive A is then applied to the inner ends 604, 704 of the respective lens holders 602, 702 and/or to the bracket(s) 2400, and the bracket(s) 2400 are positioned about the inner ends 604, 704 of the respective lens holders 602, 702 such that the bracket(s) 2400 span the ISLAs 2200, 2300. The bracket(s) 2400 thus mechanically align the ISLAs 2200, 2300 such that the optical axes Xi, Xii are coincident with each other and support the ISLAs 2200, 2300 upon assembly of the optical module 518.

It is envisioned that the adhesive connection between the bracket(s) 2400 and the ISLAs 2200, 2300 may supplement or replace the adhesive connection between the lens holders 602, 702 discussed above in connection with the optical module 502 (FIGS. 5-7) (e.g., via the application of adhesive A between the mounting surfaces 626, 726 and between the mounting surfaces 628, 728).

Following alignment of the ISLAs 2200, 2300, the optical module 518 is subjected to the aforedescribed curing procedure, thereby fixing the connection between the ISLAs 2200, 2300 and the bracket(s) 2400, after which, the ISLAs 2200, 2300 are allowed to cool and are cleaned in the manner described above.

With reference now to FIG. 21, another embodiment of the presently disclosed optical module will be discussed, which is identified by the reference character 520 and includes respective first and second ISLAs 2500, 2600. More specifically, FIG. 21 is a transverse (e.g., horizontal) cross-sectional view of the optical module 520 upon assembly. The optical module 520 and the ISLAs 2500, 2600 include features similar to the aforedescribed optical module 502 (FIGS. 5-7) and the ISLAs 600, 700 and, accordingly, will only be discussed with respect to differences therefrom in the interest of brevity. As such, identical reference characters will be utilized to refer to elements, structures, features, etc., common to the optical modules 502, 520 and the ISLAs 600, 700 and the ISLAs 2500, 2600.

As seen in FIG. 21, the lens holder 602 includes a pair of wings (arms) 2578 that extend (laterally, radially) outward therefrom (e.g., away from the optical axis Xi), each of which defines an opening 2580. Similarly, the lens holder 702 includes a pair of wings (arms) 2678 that extend (laterally, radially) outward therefrom (e.g., away from the optical axis Xii), each of which defines an opening 2680, such that the wings 2578, 2678 and the openings 2580, 2680 are (laterally, radially) aligned with each other.

In addition to the ISLAs 2500, 2600, the optical module 520 includes standoffs 2700 and mechanical fasteners 2800 (e.g., one or more screws, pins, rivets, clips, etc.), which extend through the ISLAs 2500, 2600 (via the wings 2578, 2678 and the respective openings 2580, 2680) and through the standoffs 2700 to thereby mechanically secure the ISLAs 2500, 2600 in relation to each other. Mechanically securing the ISLAs 2500, 2600 together obviates the need for the aforementioned adhesive A. Embodiments of the optical module 520 in which the ISLAs 2500, 2600 are both mechanically and adhesively secured together (e.g., embodiments including both the mechanical fasteners 2800 and the adhesive A) are also envisioned herein, however. For example, an embodiment of the optical module 520 in which the connection established by the mechanical fasteners 2800 is supplemented by utilization of the adhesive A to connect the lens holders 602, 702 (e.g., such that the adhesive A is located between the mounting surfaces 626, 726 and between the mounting surfaces 628, 728), as described in connection with the optical module 520 (FIGS. 5-7), the optical module 504 (FIGS. 8, 9), or the optical module 506 (FIGS. 10, 11), would not be beyond the scope of the present disclosure.

The standoffs 2700 are located between the wings 2578, 2678 and extend in (generally) parallel relation to the optical axes Xi, Xii. The standoffs 2700 are (generally) cylindrical (tubular) in configuration and each define an axial channel 2702, which is configured to receive one of the mechanical fasteners 2800, and opposing ends 2704, 2706. The ends 2704, 2706 of the standoffs 2700 are configured for engagement (contact) with respective inner surfaces 2582, 2682 defined by the wings 2578, 2678. More specifically, the ends 2704, 2706 of the standoffs 2700 are (generally) planar in configuration, which increases the surface area available for contact with the respective inner surfaces 2582, 2682 defined by the wings 2578, 2678, thereby enhancing the stability of the optical module 520.

While the optical module 520 is shown as including a pair of wings 2578, a pair of wings 2678, a pair of standoffs 2700, and a pair of mechanical fasteners 2800, embodiments are envisioned in which the particular number of wings 2578, wings 2678, standoffs 2700, and mechanical fasteners 2800 may be varied. For example, embodiments of the optical module 520 including a single wing 2578, a single wing 2678, a single standoff 2700, and a single mechanical fastener 2800 are also envisioned herein, as are embodiments that are devoid of the standoffs 2700 (e.g., to reduce the complexity and/or the cost associated with assembly of the optical module 520) and would not be beyond the scope of the present disclosure.

During assembly of the optical module 520, the ISLAs 2500, 2600 are advanced towards each other such that the lens holders 602, 702 are positioned in adjacent (e.g., contacting, engaging) relation. The mechanical fasteners 2800 are then inserted through the wings 2578, 2678 and into the axial channels 2702 in the standoffs 2700 such that the mechanical fasteners 2800 extend through the wings 2578, 2678 and the standoffs 2700 in (generally) parallel relation to the optical axes Xi, Xii. The mechanical fasteners 2800 are then tightened, which mechanically aligns the ISLAs 2500, 2600 such that the optical axes Xi, Xii are coincident with each other and fixes the ISLAs 2500, 2600 in relation to each other so as to inhibit (if not entirely prevent) relative movement therebetween, thereby maintaining alignment of the ISLAs 2500, 2600.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., ±25%). The term "generally parallel" should thus be understood as encompassing configurations in which the pertinent components are arranged in parallel relation. Similarly, the term "generally identical" should be understood as encompassing configurations in which the pertinent components are identical in configuration as well as configurations in which there may be insubstantial variations between the pertinent components that do not influence the substantive construction or performance thereof.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure, etc.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An optical module for an image capture system, the optical module comprising:
    a first integrated sensor-lens assembly (ISLA) defining a first optical axis and first mounting surfaces, the first ISLA oriented in a first direction and including:
        a first lens holder;
        a first lens barrel located within the first lens holder and housing a first optical group; and
        a first printed circuit board (PCB) subassembly supported by the first lens holder;
    a second ISLA defining a second optical axis coincident with the first optical axis and second mounting surfaces, wherein the first ISLA and the second ISLA are directly connected, the second ISLA oriented in a second direction generally opposite to the first direction and including:
        a second lens holder;
        a second lens barrel located within the second lens holder and housing a second optical group; and
        a second PCB subassembly supported by the second lens holder; and
    an adhesive located between the first mounting surfaces and the second mounting surfaces, thereby directly connecting the first ISLA and the second ISLA.

2. The optical module of claim 1, wherein the first mounting surfaces and the second mounting surfaces extend in generally orthogonal relation to the first optical axis and the second optical axis.

3. The optical module of claim 2, wherein the first mounting surfaces are defined by the first PCB subassembly, and the second mounting surfaces are defined by the second PCB subassembly.

4. The optical module of claim 3, wherein the first mounting surfaces are defined by innermost end walls of the first PCB subassembly, and the second mounting surfaces are defined by innermost end walls of the second PCB subassembly, the innermost end walls of the first PCB subassembly positioned adjacent to the innermost end walls of the second PCB subassembly.

5. The optical module of claim 2, wherein the first mounting surfaces are defined by the first lens holder, and the second mounting surfaces are defined by the second lens holder.

6. The optical module of claim 5, wherein the first mounting surfaces are defined by innermost end walls of the first lens holder, and the second mounting surfaces are defined by innermost end walls of the second lens holder, the innermost end walls of the first lens holder positioned adjacent to the innermost end walls of the second lens holder.

7. The optical module of claim 6, wherein the first lens holder and the second lens holder include corresponding locating members associated with the first mounting surfaces and the second mounting surfaces, respectively, the corresponding locating members configured to facilitate proper alignment of the first ISLA and the second ISLA during assembly of the optical module.

8. The optical module of claim 1, wherein the first mounting surfaces and the second mounting surfaces extend in generally parallel relation to the first optical axis and the second optical axis.

9. The optical module of claim 8, wherein the first mounting surfaces are defined by the first PCB subassembly, and the second mounting surfaces are defined by the second PCB subassembly.

10. The optical module of claim 9, wherein the first mounting surfaces are defined by lateral sidewalls of the first PCB subassembly, and the second mounting surfaces are defined by lateral sidewalls of the second PCB subassembly, the lateral sidewalls of the first PCB subassembly positioned adjacent to the lateral sidewalls of the second PCB subassembly.

11. The optical module of claim 8, wherein the first mounting surfaces are defined by the first lens holder, and the second mounting surfaces are defined by the second lens holder.

12. The optical module of claim 11, wherein the first mounting surfaces are defined by lateral sidewalls of the first lens holder, and the second mounting surfaces are defined by lateral sidewalls of the second lens holder, the lateral sidewalls of the first lens holder positioned adjacent to the lateral sidewalls of the second lens holder.

13. An optical module for an image capture system, the optical module comprising:
    a first integrated sensor-lens assembly (ISLA) defining a first optical axis;

a second ISLA defining a second optical axis coincident with the first optical axis, wherein the first ISLA and the second ISLA are generally identical in configuration and are oriented in generally opposite directions, wherein the first ISLA and the second ISLA are directly connected; and mechanical fasteners extending through the first ISLA and the second ISLA to thereby secure the first ISLA and the second ISLA in relation to each other.

14. The optical module of claim 13, wherein the first ISLA includes a first pair of wings extending outwardly therefrom, and the second ISLA includes a second pair of wings extending outwardly therefrom, the mechanical fasteners extending through the first pair of wings and through the second pair of wings.

15. The optical module of claim 13, further comprising standoffs located between the first ISLA and the second ISLA to thereby enhance stability of the optical module, the mechanical fasteners extending through the standoffs.

16. The optical module of claim 13, further comprising an adhesive located between the first ISLA and the second ISLA to further secure the first ISLA and the second ISLA in relation to each other.

17. An optical module for an image capture system, the optical module comprising:

a first integrated sensor-lens assembly (ISLA) defining a first optical axis;

a second ISLA defining a second optical axis coincident with the first optical axis, wherein the first ISLA and the second ISLA are generally identical in configuration and are oriented in generally opposite directions, wherein the first ISLA and the second ISLA are directly connected; and a bracket located externally of, and extending between, the first ISLA and the second ISLA to thereby secure the first ISLA and the second ISLA in relation to each other.

18. The optical module of claim 17, wherein the bracket is adhesively secured to the first ISLA and to the second ISLA.

19. The optical module of claim 17, wherein the first ISLA includes:

a first lens holder having an inner end and an outer end opposite to the inner end; and a first lens barrel located within the first lens holder and housing a first optical group, the second ISLA including:

a second lens holder having an inner end and an outer end opposite to the inner end; and a second lens barrel located within the second lens holder and housing a second optical group.

20. The optical module of claim 19, wherein the bracket extends about the inner end of the first lens holder and about the inner end of the second lens holder.

* * * * *